United States Patent [19]

Barkans et al.

[11] Patent Number: 5,428,810
[45] Date of Patent: Jun. 27, 1995

[54] ALLOCATION OF RESOURCES OF A PIPELINED PROCESSOR BY CLOCK PHASE FOR PARALLEL EXECUTION OF DEPENDENT PROCESSES

[75] Inventors: Anthony C. Barkans; Roger Swanson, both of Fort Collins, Colo.

[73] Assignee: Hewlett-Packard Company, Palo Alto, Calif.

[21] Appl. No.: 220,948

[22] Filed: Mar. 31, 1994

Related U.S. Application Data

[63] Continuation of Ser. No. 669,824, Mar. 15, 1991, abandoned.

[51] Int. Cl.⁶ .......................... G06F 13/00; G06F 9/38
[52] U.S. Cl. ..................................... 395/800; 395/550; 364/230; 364/231.4; 364/231.8; 364/271.2; 364/DIG. 1
[58] Field of Search ............... 395/800, 775, 725, 425, 395/325, 575, 550; 364/230, 231.4, 231.8, 271.2, DIG. 1

[56] References Cited

U.S. PATENT DOCUMENTS

| | | | |
|---|---|---|---|
| 4,354,227 | 10/1982 | Hays, Jr. et al. | 395/725 |
| 4,481,578 | 11/1984 | Hughes et al. | 395/425 |
| 4,594,655 | 6/1986 | Hao et al. | 395/775 |
| 4,695,943 | 9/1987 | Keeley et al. | 395/425 |
| 4,789,927 | 12/1988 | Hannah | 364/200 |
| 5,060,145 | 10/1991 | Scheuneman et al. | 395/425 |

OTHER PUBLICATIONS

Patterson and Hennessy, *Computer Architecture: A Quantitative Approach*, Morgan Kaufmann Publishers, San Mateo, Calif., 1990, pp. 250–349.

A. C. Barkans, "High Speed High Quality Antialiased Vector Generation", *Computer Graphics*, vol. 24, No. 4, Aug. 1990, pp. 319–326.

Primary Examiner—Alyssa H. Bowler
Assistant Examiner—John Harrity

[57] ABSTRACT

A technique of processing pipeline commands in parallel so as to minimize pipeline stalls. This is accomplished in accordance with the invention without need for the complex resource allocation techniques of the prior art by arbitrating access to critical pipeline resources on the phase of the system clock. For example, one control process may access the critical pipeline resource only during an even phase of the system clock, while a second control process may access the critical pipeline resource only during the odd phase of the clock. These processes may run at the same time if the pipelined instructions being executed by each process have no data dependencies since structural hazards are effectively eliminated by time-sharing the data buses on the respective phases of the system clock. The benefits of dynamically scheduled pipelined systems may thus be obtained without the complex scoreboarding and other scheduling algorithms used in the prior art to prevent pipeline hazards.

7 Claims, 4 Drawing Sheets

50 MHz  *Fig. 2(a)*
25 MHz  *Fig. 2(b)*
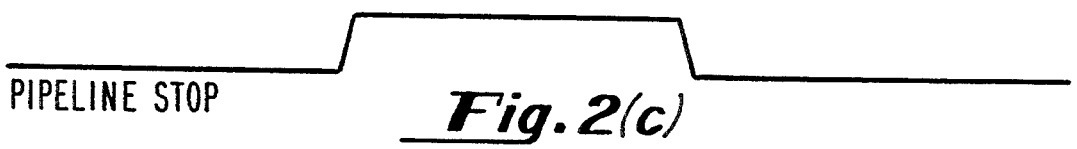
PIPELINE STOP  *Fig. 2(c)*
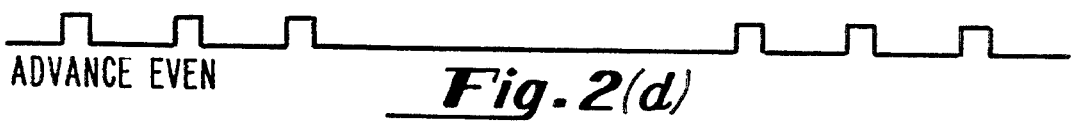
ADVANCE EVEN  *Fig. 2(d)*
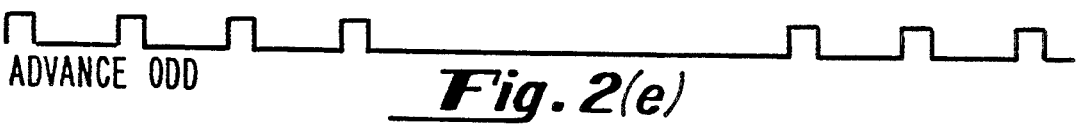
ADVANCE ODD  *Fig. 2(e)*
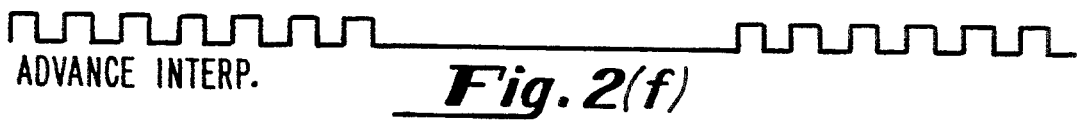
ADVANCE INTERP.  *Fig. 2(f)*
PIPE_LOCAL (NONRENDERING)  *Fig. 2(g)*
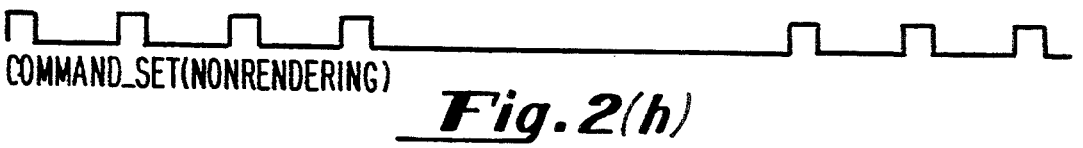
COMMAND_SET (NONRENDERING)  *Fig. 2(h)*
PIPE_LOCAL (RENDERING)  *Fig. 2(i)*
COMMAND_SET (RENDERING)  *Fig. 2(j)*

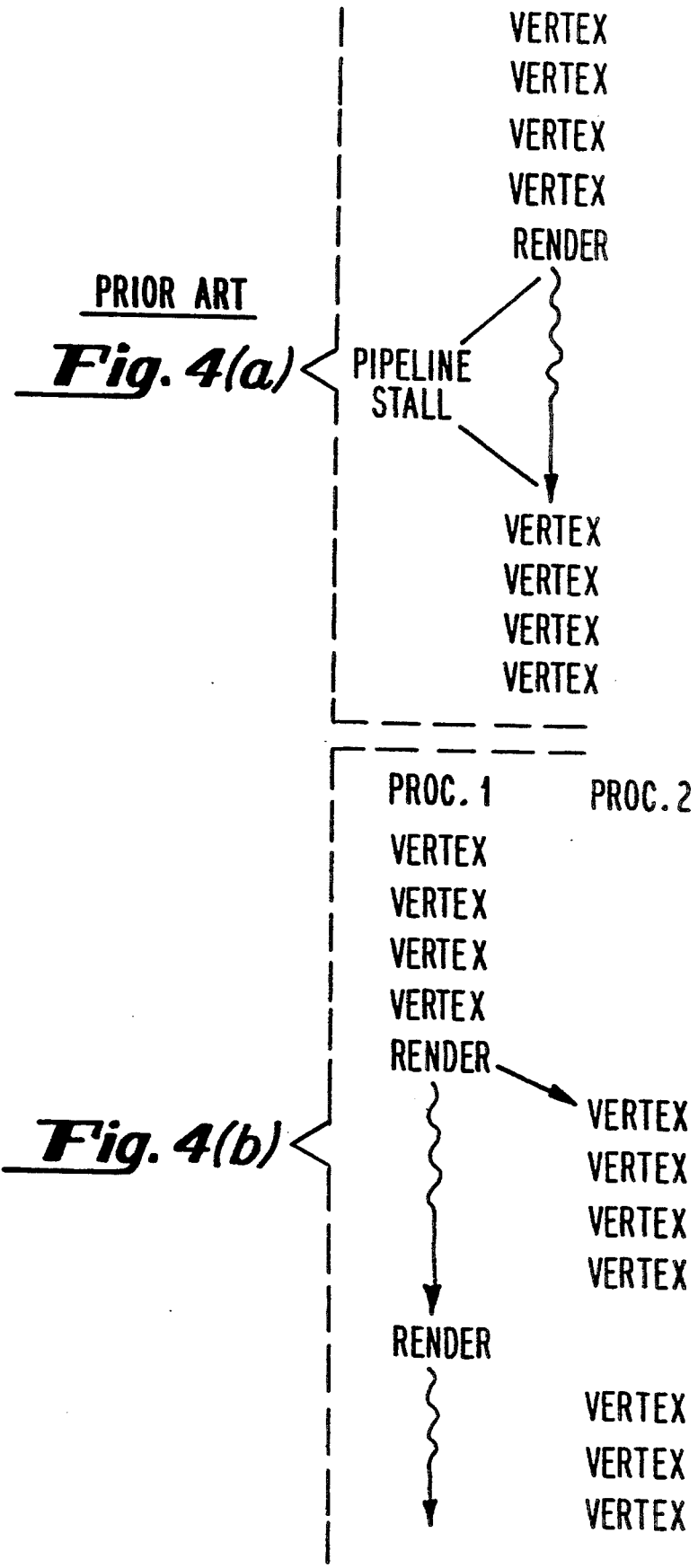

ALLOCATION OF RESOURCES OF A PIPELINED PROCESSOR BY CLOCK PHASE FOR PARALLEL EXECUTION OF DEPENDENT PROCESSES

CROSS REFERENCE TO RELATED APPLICATION

This is a continuation of application Ser. No. 07/669,824 filed on Mar. 15, 1991, now abandoned.

BACKGROUND OF THE INVENTION

1. Field of the Invention

The present invention relates to a technique for dynamic scheduling of a pipelined processor for parallel execution of multiple processes, and more particularly, to a pipelined processing system which executes multiple processes in parallel and arbitrates access to shared resources on a phase of the system clock so as to eliminate the need for complex resource allocation algorithms.

2. Description of the Prior Art

Since the processing speed and hence performance of data processing systems doubles every year or so, engineers are constantly searching for new ways to improve the processing speeds of their systems in order to remain competitive. A typical way to improve processing speed and hence to shorten execution time has been to utilize multiprocessing techniques in which a plurality of processors are operated in parallel. For example, several general purpose processors may be loosely coupled in parallel such that jobs which are to be performed by the respective processors are assigned on a process basis and executed in parallel. An example of a general purpose machine having loosely coupled parallel processors which process data in this manner is the VAX 785. Even faster execution may be obtained by placing several special purpose processors in parallel. Special purpose processors arranged in this manner have improved efficiency because they may be tightly coupled to one another to perform a limited special purpose job such as geometric transformation of input coordinates or polygon rendering in a computer graphics system. Parallel special purpose processors may also be interleaved for pipelined processing applications as described by Hannah in U.S. Pat. No. 4,789,927 issued Dec. 6, 1988.

Another technique for providing faster execution in a data processing system is to speed up the execution on each processor. In other words, a typical way to improve the processing speed is to increase the frequency of the system clock. Increasing the frequency of the system clock improves performance nearly linearly for typical data processing systems by reducing the cycle time. However, data processing systems can only function as rapidly as their hardware and control process permits, and, as a result, there are limits as to how much the frequency of the system clock may be increased.

Yet another technique for improving execution time in a data processing system is pipelining. Pipelining is an implementation technique in which multiple instructions are simultaneously overlapped in execution. Each step in the pipeline completes a part of the instruction by breaking the work to be done in an instruction into smaller pieces and processing each of those pieces, whereby processing of each instruction piece takes a fraction of the time as processing the entire instruction. Each of these steps is called a pipe stage or pipe segment and is implemented on what is referred to herein as a "pipelined processing circuit". The pipelined processing circuits are connected one to the next to form a pipeline in which the instructions enter at one end, are processed through the respective pipelined processing circuits, and exit at the other end. As known to those skilled in the art, if the pipelined processing circuits process the data at approximately the same speed, the speedup from such pipelining approaches the number of pipe stages. For this reason, pipelining is the key implementation technique used to make fast central processing units (CPUs) and also is the subject of the present invention.

The throughput of a pipeline is determined by how often an instruction exits the pipeline. Because the pipe stages are connected together, all the stages must be ready to proceed at the same time. The time required between moving an instruction a single step down the pipeline is referred to as a machine cycle, where the length of a machine cycle is determined by the time required for the slowest pipe stage because all stages proceed at the same time. The machine cycle is typically one clock cycle, but may be two or more. The clock may also have multiple phases. Moreover, by making the pipe stages approximately equal in length, pipelining yields a reduction in the average execution time per instruction by decreasing the clock cycle time of the pipelined machine. Thus, pipelines can be used to both decrease the clock cycle and to maintain a low CPI.

Execution time in a pipelined system thus may be reduced if the pipe stages are made substantially equal in length and the frequency of the system clock is maximized. However, in a pipelined processing system the true measure of the effectiveness of increasing the frequency of the system clock is the number of clock cycles per instruction (CPI) necessary to process a particular instruction. As will be described below, several techniques have been proposed for minimizing the CPI of a pipelined processing system so as to improve the processing efficiency of the system. Such techniques employ different combinations of parallel processing and fast processor clocks. However, such techniques have typically been based on the needs of a general purpose processor and have not taken advantage of the characteristics of special purpose processors.

Pipelined architectures introduce several problems which must be overcome by a designer if the processing efficiency of a processing system is to be actually improved by pipelining. For example, there are situations, called hazards, that prevent the next instruction in the instruction stream from executing during its designated clock cycle. Hazards reduce the performance from the ideal speedup gained by pipelining and may be classified as one of three types: Structural, Data and Control hazards. Structural hazards arise from resource conflicts when the underlying hardware cannot support all possible combinations of instructions in simultaneous overlapped execution, while Data hazards arise when an instruction depends on the results of a previous instruction in a way that it is exposed by the overlapping of instructions in the pipeline. Control hazards arise from the pipelining of branches and other instructions that change the program counter. Such hazards prevent instructions from executing in their designated clock cycles because they make it necessary to stall the pipeline to eliminate the hazard. Such stalls cause a significant adverse effect on performance, for in a pipelined machine there are multiple instructions under execution at once. In other words, a stall in a pipelined machine often requires that some instructions be allowed to proceed, while others are delayed. Typically, when an instruction is stalled, all instructions later in the pipeline than the stalled instruction are also stalled. On the other hand, instructions earlier than the stalled instruction can continue, but no new instructions are fetched during the stall. The instructions thus may not complete in the desired order, thereby creating further problems. Accordingly, much design effort in a pipelined processing system is used to prevent stalls by preventing such hazards or at least by dealing with these hazards as they develop.

As known to those skilled in the art, when a processing system is pipelined, the overlapped execution of instructions requires pipelining of functional units and duplication of resources to allow all possible combinations of instructions in the pipeline. As noted above, a structural hazard results if some combination of instructions cannot be accommodated due to resource conflicts. The most common instances of structural hazards arise when some functional unit is not fully pipelined. Then a sequence of instructions that all use that functional unit cannot be sequentially initiated in the pipeline. Another common way that structural hazards appear is when some resource has not been duplicated enough to allow all combinations of instructions in the pipeline to execute. When a sequence of instructions encounters a structural hazard, the pipeline will stall one of the instructions until the required unit is available. Unfortunately, red, oval of all such structural hazards is unrealistic, for to do so would substantially increase the cost of the processing system and increase the latency of the pipeline. Accordingly, the typical approach has been to account for all structural hazards and take the necessary steps to minimize their effects. Such techniques will be described in more detail below.

As noted above, a major effect of pipelining is to change the relative timing of instructions by overlapping their execution. However, by overlapping the execution of instructions in this manner, data and control hazards are introduced. Data hazards occur when the order of access to operands is changed by the pipeline versus the normal order encountered by sequentially executing instructions. For example, if a second instruction of two adjacent pipelined instructions has a source that is the destination of the first instruction, precautions must be taken to ensure that the second instruction does not access the destination of the first instruction before it has been updated. Unless precautions are taken to prevent such data hazards, the second instruction will read the wrong value and try to use it. Such unpredictable behavior is of course unacceptable.

Generally, a data hazard is created whenever there is a dependence between instructions which are close enough that the overlap caused by pipelining would change the order of access to an operand. For example, in the special case of a rendering processor in a computer graphics system, the vertex data and rendering command can create data hazards. Data hazards also may result when a pair of instructions create a dependence by writing and reading the same memory location. For example, cache misses could cause the memory references to get out of order if the processor were allowed to continue working on later instructions while an earlier instruction that missed the cache was accessing memory. Accordingly, when a cache miss is encountered, the entire pipeline must be stalled, effectively making the instruction that contained the miss run for multiple clock cycles. However, stalls may be partially avoided by rearranging the code sequence to eliminate the hazard causing the stall. Such techniques are called pipelined scheduling or instruction scheduling and have been widely used by those skilled in the art. Such pipeline scheduling typically is quite complex but has been effectively used to keep the CPI on the order of one.

Control hazards can cause an even greater performance loss for a pipeline than data hazards. For example, when a branch is executed, it may or may not change the program counter to something other than its current value plus the length of an instruction. If an instruction is a taken branch, then the program counter is normally not changed until the end of the memory cycle, after the completion of the address calculation and comparison. This means stalling the pipeline for the instruction decode, the execute and the memory access cycles, at the end of which the new program counter is known and the proper instruction can be fetched. This effect is called a control or branch hazard and can be addressed by a technique known by those skilled in the art as branch prediction. Although branch prediction is quite simple, it does not effectively reduce the CPI to less than one.

The above and other problems and features of pipelining have been discussed in detail by Patterson and Hennessy in Chapter 6 of a text entitled *Computer Architecture: A Quantitative Approach*, Morgan Kaufmann Publishers, San Mateo, Calif., 1990, pp. 250-349, the contents of which are incorporated herein by reference. For example, Patterson et al. teach that data dependencies may be minimized by using software to schedule the instructions to minimize stalls. Such an approach is called static scheduling. On the other hand, a technique known as dynamic scheduling may be used, whereby the hardware rearranges the instruction execution to reduce the stalls. Unfortunately, the advantages which are gained by dynamic scheduling have heretofore come at a significant cost in increased hardware complexity.

For example, scoreboarding is a sophisticated prior art technique for dynamically scheduling around hazards by allowing instructions to execute out of order when there are sufficient resources and no data dependencies. In particular, a scoreboard is used to separate the process of issuing an instruction into two parts, namely, checking the structural hazards and waiting for the absence of a data hazard. Structural hazards can be checked when an instruction is issued; however, if the instructions are to begin execution as soon their data operands are available, the pipeline will have to perform out of order execution. Scoreboarding makes this possible.

The goal of a scoreboard is to maintain an execution rate of one instruction per clock cycle when there are no structural hazards by executing an instruction as early as possible. Thus, when an instruction at the front of an input queue is stalled, other instructions can be issued and executed if they do not depend on any active or stalled instruction. The scoreboard takes full responsibility for instruction issue and execution, including all hazard detection. Taking advantage of out of order execution requires multiple instructions to be in their execution stage simultaneously. This can be achieved with either multiple functional units or with pipelined functional units. Accordingly, a scoreboard acts as a means for resource allocation which checks for hazards and then allocates the instructions accordingly.

FIG. 1 illustrates a pipelined processing system utilizing a scoreboard. As shown, a plurality of registers 100 are provided which are accessed by respective pipelined processing circuits 102–108 to perform pipelined processing functions on the data stored therein. A scoreboard 110 is provided for receiving every instruction and constructing a picture of the data dependencies of the respective instructions. This picture is then used by scoreboard 110 to determine when an input instruction can read its operands and begin execution. If scoreboard 110 decides the instruction cannot execute immediately, it monitors every change in the hardware and decides when the instruction can execute. Scoreboard 110 also controls when an instruction can write its result into its destination register. Thus, all hazard detection and resolution is centralized in the scoreboard 110.

Scoreboard 110 also controls the instruction progression from one step to the next by communicating with the functional units 102–108. However, since there is only a limited number of source operands and result buses to the registers 100, scoreboard 110 must guarantee that the functional units allowed to proceed do not require more than the number of data busses available. In other words, the data busses are treated by the scoreboard as resources which must be allocated. This added complexity often causes the scoreboard 110 to have about as much logic as one of the functional units and, on average, about four times as many data busses as would be required if the pipeline only executed instructions in order. Such complexity is undesirable, and it is desired that relatively simple techniques be developed for efficient pipelined processing. In particular, an alternative to the use of scoreboards for special purpose pipelined processing systems is desired.

In addition to branch prediction and static and dynamic pipeline scheduling, one other prior art technique for improving execution on a single processor merits discussion here. A technique known as superscalar allows the CPI to be decreased to less than one. Since the CPI cannot be reduced below one if only one instruction is issued every clock cycle, superscalar is a technique whereby multiple instructions are issued in a clock cycle for parallel execution. This allows the instruction execution rate to exceed the clock rate. Typical superscalar pipelined processing systems issue a few instructions in a single clock cycle. However, if the instructions in the instruction stream are dependent or do not meet certain criteria, only the first instruction in the sequence will be issued since a hazard has been detected.

Superscalar systems are also extremely complicated and require additional hardware. However, the need for additional hardware may be minimized if the instructions use different register sets and different functional units. Moreover, any contentions may be treated as structural hazards and overcome by delaying the issuance of one of the instructions which causes the contention. The contention can also be eliminated by adding several additional bypass paths. However, these solutions make the superscalar system just that much more complicated.

Superscalar pipelines also suffer from other problems which limit their effectiveness. For example, in a superscalar pipeline the result of a load instruction cannot be used on the same clock cycle or on the next clock cycle. As a result, the next three instructions cannot use the load result without stalling. Accordingly, to effectively exploit the parallelism available in a superscalar pipeline, more ambitious compiler-scheduling or hardware implemented scoreboarding techniques, as well as more complex instruction decoding, must be implemented. Such techniques unduly complicate the processing and are generally undesirable except in the most sophisticated general purpose pipelined processing systems.

Accordingly, although branch prediction, pipeline scheduling and superscalar techniques as described above have effectively lowered the CPI in prior art pipelined processing systems, this improvement has come with great costs in hardware complexity. Moreover, such techniques are generally based on the needs of a general purpose machine. Thus, in order to lower the CPI for a special purpose pipelined processing system, such as a computer graphics system, other techniques for reducing the CPI are desired which have the benefits of the systems described above yet are much simpler and hence easier to implement in a special purpose pipelined architecture. The present invention relates to such a technique.

SUMMARY OF THE INVENTION

The above-mentioned shortcomings in the prior art have been met in accordance with the present invention by developing a technique for dynamic scheduling of a pipelined processor for parallel execution of multiple processes. The technique of the invention is quite straightforward and eliminates the need for complex resource allocation algorithms of the type used in prior art pipelined processing systems of the type described above. In particular, the present invention allocates critical resources shared by multiple processes by synchronizing the processes to the respective phases of the system clock. As used herein, a critical resource is a resource of the pipeline which must be accessed by a process to continue its command execution and to prevent pipeline stalls. In other words, certain input commands are given access to shared critical resources only during particular phases of the system clock. By so arbitrating access to shared critical resources based upon the phase of the system clock, instructions need not be executed in sequential order so long as there are no data dependencies between the respective instructions. Moreover, such an arrangement effectively implies a scoreboard of the type used in the prior art from the hardware configuration of the system, whereby resource allocation is inherent in the design. In particular, there is no need to check for a structural hazard or wait for the absence of a data hazard since the respective processes share critical resources in a time-division multiplexed manner. The present invention thus resolves, without adding undue complexity, the resource allocation problems which have heretofore limited the performance of pipelined processing systems.

In particular, the present invention relates to a pipelined processing system comprising a data pipeline having at least one pipelined processing circuit and a system clock for applying clocking signals to the at least one pipelined processing circuit of the data pipeline. Pipeline control means are also provided for controlling the access to critical resources within the data pipeline. Such pipeline control means in accordance with a preferred embodiment of the invention comprises at least two control processes synchronized to respective predetermined phases of the system clock such that each control process controls the access to critical resources within the data pipeline during its predetermined phase of the system clock and does not control the access to critical resources within the data pipeline during other phases of the system clock. Since each control process is only given access to critical resources during its predetermined phase of the system clock, structural, data and control hazards are minimized. Moreover, since the control processes allow the pipelined processing circuits to operate in parallel on different phases of the clock, system throughput is increased and the CPI reduced. Such an arrangement has been found to almost double performance with virtually no additional hardware.

Since the presence of data dependencies can be predetermined in a special purpose processing system, the present invention is particularly useful in pipelined special purpose processing systems such as pipelined rendering circuitry of computer graphics systems. However, the technique of the invention may be readily applied to general purpose processing systems in ways which will be readily apparent to those skilled in the art.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings of which:

FIGS. 2(a)-(2j) respectively illustrate timing diagrams for use in describing the dynamic scheduling technique of the present invention.

FIGS. 4(a) and 4(b) respectively illustrate pipelined operation in accordance with a prior art pipelined processing technique without dynamic scheduling and the pipelined processing technique of the invention whereby pipeline stalls are prevented using dynamic scheduling based on the system clock.

DETAILED DESCRIPTION OF THE PRESENTLY PREFERRED EMBODIMENT

Figure 1:
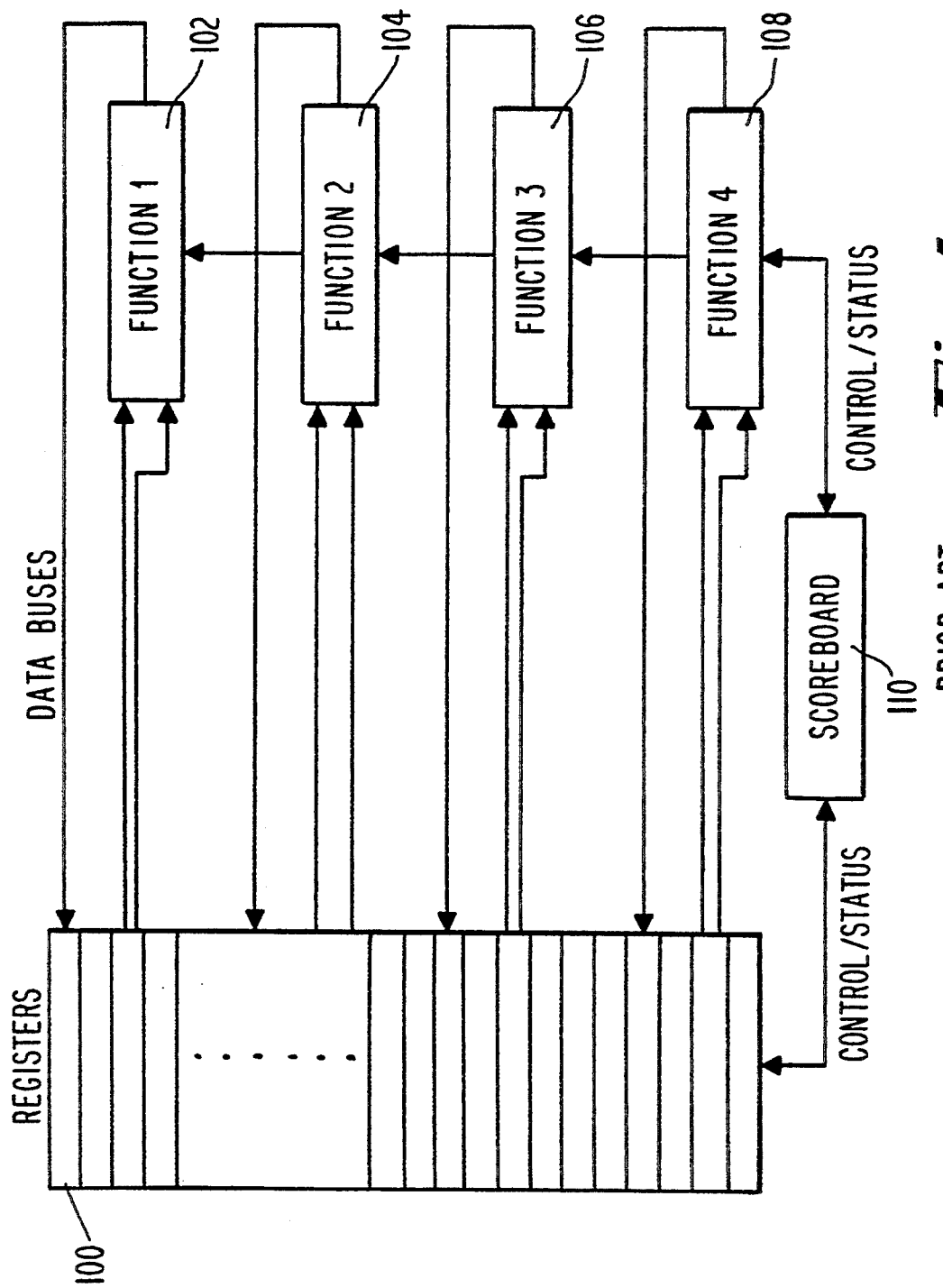
FIG. 1 illustrates a prior art pipelined processing system in which a scoreboard is used to allow pipeline instructions to execute out of order when there are sufficient resources and no data dependencies between respective instructions.

A system and method which affords the abovementioned and other beneficial features in accordance with a presently preferred exemplary embodiment of the invention will be described below with reference to FIGS. 2-4. Although the invention is described herein in conjunction with a pipelined pixel rendering system of a computer graphics system, and more particularly, in conjunction with a pipelined polygon scan line stepper (X-stepper) of the type described in related U.S. patent application Ser. No. 07/670,552, filed Mar. 15, 1991 (reference number 189339), the contents of which are hereby incorporated by reference, it will be appreciated by those of ordinary skill in the art that the principles of the invention may be applied to general and special purpose pipelined processing systems in other data processing environments as well. For example, the techniques of the invention may be readily applied to reduced instruction set computer (RISC) processors as well as pipelined supercomputer processors. Moreover, those skilled in the art will appreciate that the description given herein is for explanatory purposes only and is not intended in any way to limit the scope of invention. All questions regarding the scope of the invention may be resolved by referring to the appended claims.

Although not necessary to the invention, the preferred embodiment of the invention takes advantage of the fact that VLSI circuits may operate at frequencies substantially higher than that at which the input/output operations may be performed. In other words, while the frequency of the system clock is limited by the I/O capability of the system (due to propagation delays on the circuit board, clock skew, and the like), the frequencies used in the VLSI circuits need not be so limited. For example, in a preferred embodiment the data pipeline is synchronized to a system clock operating at 25 MHz, while the control system for the data pipeline is implemented in programmable logic arrays (PLAs) synchronized to a system clock operating at 50 MHz. Preferably, the 25 MHz clocks are derived from the 50 MHz clocks and are further synchronized to each other so that clock phases may be defined for arbitrating access to critical resources in accordance with the teachings of the invention. The general concept of using respective phases of the system clock to arbitrate access to shared resources will first be described conceptually with respect to FIGS. 2(a)-2(e).

FIG. 2(a) illustrates a 50 MHz signal which is applied to the control PLAs of the pipeline control system, while FIG. 2(b) illustrates a 25 MHz signal which is applied to the pipelined processing circuits in the data pipeline. As shown, these signals are synchronized to each other such that a complete cycle of the 50 MHz signal occurs during both the low and the high states of the 25 MHZ signal. For ease of description, the 25 MHz signal is defined as being in an even state when the output value is low and in an odd state when the output value is high. As will be described in detail below, these even and odd states are used to arbitrate access to shared resources between two control processes. However, one skilled in the art will appreciate from the following description that the technique of the invention can also be used on system clocks having three, four or more phases. Such an extension would merely require a modulo counter for counting the phases of the clock such that structural and data hazards can be avoided. The control processes would then operate during their assigned phase of the system clock.

Generally, the present invention utilizes a simplified dynamic scheduling technique based on the system clock phase to control access to critical resources of a data pipeline. A first control process controls access to critical resources of the data pipeline for the usual case. However, in accordance with the technique of the invention, the first process controls critical resources in the data pipeline only during an even (or odd) phase of the system clock and will not control the critical resources in the data pipeline during the odd (or even) phase of the system clock. Then, a second (parasitic) control process will be used to control the critical resources in the data pipeline only during the odd (or even) phase of the system clock, provided, however, that the pipeline instruction executed by the second process during the odd (or even) phase of the system clock has no data dependencies with the instruction being executed during the even (or odd) phase of the system clock by the first process. The second process thus can only process those instructions which do not have data dependencies with instructions being executed by the first process, while the first process can operate on all input instructions irrespective of the existence of the second process (albeit at a substantially reduced performance).

The control processes of the invention are basically responsible for allocating access to critical resources of the data pipeline in synchronization by generating "advance pipe" signals which instruct the pipelined processing circuit to advance to the next processing state. In accordance with the invention, the first process will produce "advance even" signals at the end of an even state (FIG. 2(d)) and "advance odd" signals at the end of an odd state (FIG. 2(e)). Accordingly, those resources controlled by the first process during the even state will be advanced at the end of the current even clock cycle, while those resources controlled by the first process during the odd state will be advanced at the end of the current odd clock cycle so long as those resources are not critical. The net result is that control of only the critical resources will be time-division multiplexed.

For a dual process control system, the system clock states are arranged into sets of two such that every even state will be followed by its odd state as is apparent from FIG. 2(b). Thus, although each control process is operated by a 50 MHz signal, each control process will only advance data using the critical resources during its assigned clock phase (odd or even) of the 25 MHz clock.

Several rules must be implemented for the system herein defined to avoid data hazards. For example, all conditional jumps in the control processes must enforce the even/odd rule set forth above. For example, this may be accomplished by specifying that conditional jumps are only from odd states to even states. Also, pipeline stalls should always stop the pipeline at the beginning of an even (or odd) state. Thus, when the pipeline restarts, the pipeline may be resynchronized by starting with the next even (or odd) state. FIG. 2(c) illustrates a pipelined stop which occurs, for example, when a particular instruction has encountered a cache miss. As shown, downstream circuitry is not advanced when the pipeline is stopped, and no further execution takes place until the first "advance even" state is received after the pipeline stop ends. However, as will be described below with respect to FIG. 2(j), the second control process continues to operate even when the pipeline is stopped during a pipeline stop. Such a feature is particularly advantageous when short vectors are being rendered, since short vectors generate numerous cache misses.

In addition, data busses similarly must be arbitrated as herein described in order to prevent data contention on the data busses. Accordingly, just as instructions inherently know that they can use critical resources because of the clock phase, the data processing circuits know that they have control of the data busses when they are instructed to pass data to the next pipe stage. As a result, complex resource allocation techniques such as scoreboarding are not required.

A preferred embodiment of the invention more specifically setting forth the advantages of the invention now will be described with respect to FIG. 3.

Figure 3:
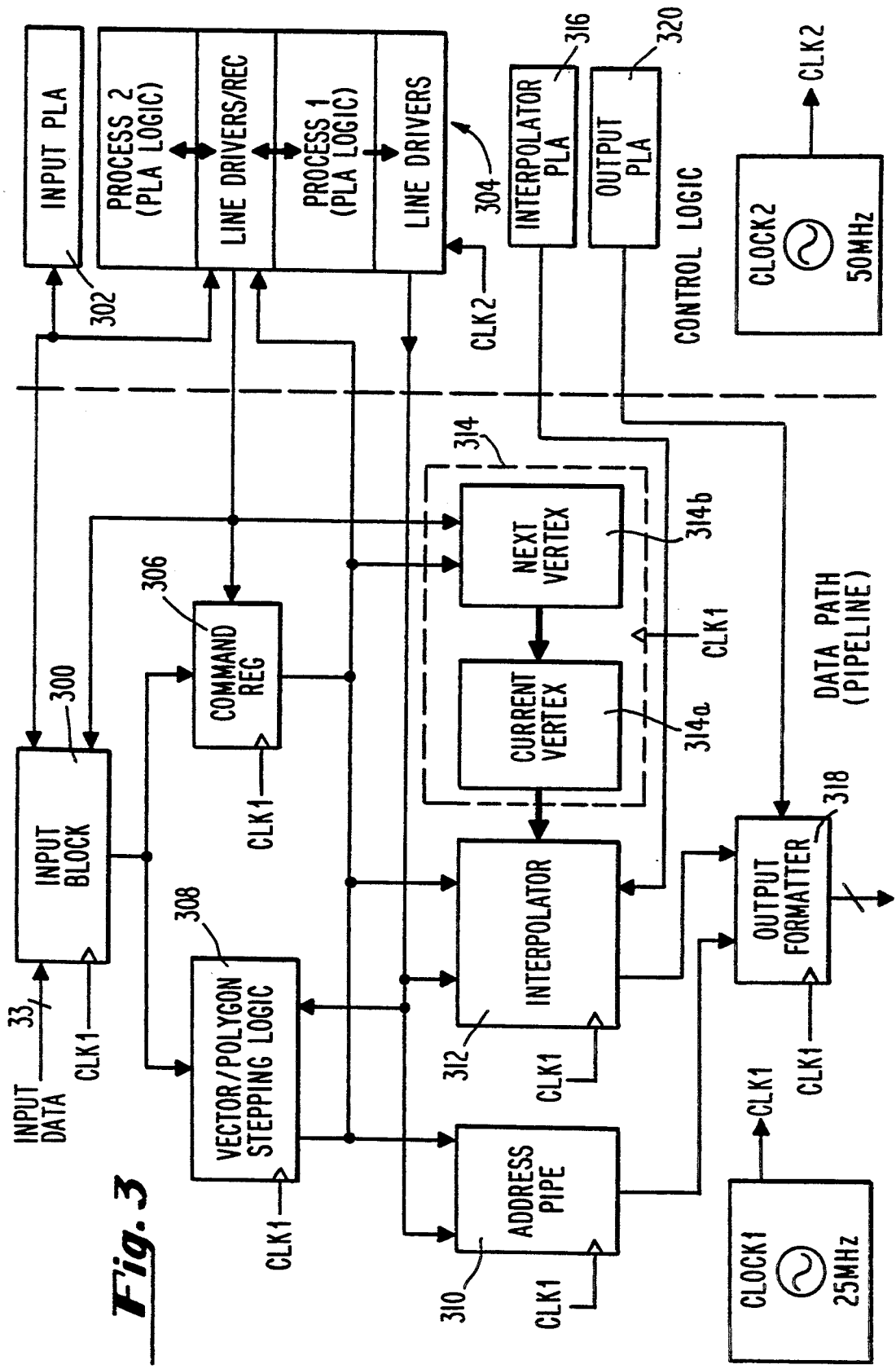
FIG. 3 illustrates a preferred embodiment of the invention as implemented in a pixel processor of a pipelined computer graphics system.

FIG. 3 schematically depicts a preferred embodiment of a pixel processor in a pipelined computer graphics system incorporating the dynamic scheduling technique of the invention. As shown, input data including pipeline instructions are received from a graphics processsor by an input block 300. Input block 300 connects the pixel processor of FIG. 3 to upstream components of the graphics processing system and preferably provides a "handshake" function for the input data. In other words, input block 300 stores the input data in registers and places the data on a data bus in blocks of predetermined sizes for passage to the downstream pipelined processing circuits of the pixel processor. As known to those skilled in the computer graphics art, the input instructions may include draw trapezoid commands or draw vector (rendering) commands, store vertex (setup) commands and the like. When input control PLA 302 detects that valid data has been received by input block 300, control process 1 of data pipeline control device 304 is informed via its line driver that valid input is available to be processed in the input block 300. Control process 1 of data pipeline control device 304 then instructs input block 300 to clock its input data through to command register 306, where the commands are issued and decoded under control of control process 1. Those skilled in the art will appreciate that since all input commands must be evaluated, command register 306 becomes a critical resource, for all decisions about execution of commands are made by control process 2 while control process 1 control rendering. As shown, control process 1 (which may be implemented via PLAs as shown below in the attached Appendix) communicates via the line drivers (output transistors) of data pipeline control device 304 to control the transfer and decoding of the commands in accordance with known techniques.

As noted above, the input commands may be draw trapezoid commands, draw vector commands, store vertex data commands and the like. For ease of description, it will be assumed that the input commands will be either store vertex data commands or rendering commands. As known to those skilled in the computer graphics art, the vertex data for the next primitive has no data dependency with the current rendering commands in progress. The rendering command, on the other hand, uses the vertex data of each input polygon to calculate the values of all pixels within the polygon having the indicated vertices and thus has numerous data dependencies.

The polygons to be rendered may come in many different sizes. For example, screen sized polygons can require over a million clock cycles to be used in the calculation of their display pixel values. Large polygons thus may cause the data pipeline to be stalled for many clock cycles. However, in the typical case the vertex commands take about as long to process as the rendering commands. Thus, on average, the two processes controlling the critical resources are about balanced so as to allow approximately a two times performance speedup.

The dynamic scheduling technique of the invention is thus advantageous in that it minimizes the adverse effects of the pipeline stalls by allowing subsequent commands, such as store vertex (setup) commands for the next polygon, to be processed during an opposite phase of the system clock. This allows the pipeline to be set up for the next polygon render while the current rendering step is performed, thereby improving processing efficiency. The processing improvement can best be appreciated by referring to FIGS. 4(a) and 4(b).

FIG. 4(a) illustrates the pipelined instruction sequence for rendering a polygon in accordance with prior art techniques. As shown, the vertices of the polygon to be rendered are read in and then rendered. The rendering instruction may execute for many clock cycles and cause a pipeline stall during which no other processing may take place. When the polygon is finally rendered, the vertices of the next polygon to be rendered are read in and the process repeated. As noted above, these pipeline stalls may cause significant adverse effects in processing efficiency.

By contrast, FIG. 4(b) illustrates the technique of the invention whereby a second control process is activated on opposite phases of the system clock to process the store vertex commands while the previous polygon is being rendered under control of the first control process. As shown, the effects of the pipeline stalls can be minimized by setting up the pipeline for processing of subsequent polygons as previous polygons are rendered. The technique for accomplishing this will be described in more detail by referring back to FIG. 3.

During normal operation of the pipeline circuit of FIG. 3, control process 1 examines each input instruction stored in command register 306 and instructs the downstream hardware such as vector/polygon stepper 308, address pipeline 310 and interpolator 312 to perform the necessary pipelined processing functions. In fact, so long as the input commands have data dependencies, the processing of the pipelined circuit of FIG. 3 proceeds as in the prior art system depicted in FIG. 4(a). However, if control process 1 is processing a render command and the next input command is a command, such as a store vertex command, which has no data dependencies with the current render commands, the benefits of the dynamic scheduling technique of the invention may be appreciated.

Accordingly, in the preferred embodiment of the invention, when input PLA 302 informs pipeline control circuit 304 that valid data has been received, control process 1 is started to handle the input commands. A source file listing of a PLA which performs the functions of control process 1 is attached below as an Appendix. Control process 1 is assigned an even (or odd) phase of the system clock and hence only controls access to critical resources such as command register 306 during the assigned clock phase. During the unassigned clock phase, access to the critical resources is not permitted. However, when a rendering command is recognized by control process 1, control process 2 is started and assigned an opposing phase of the clock for accessing critical resources. Control process 2 then reads the next instruction from the command register 306 to determine if the next instruction is one that can be processed while control process 1 controls the polygon render. The aforementioned Appendix also sets forth a preferred embodiment of PLA code for implementing control process 2. Control process 2 is shown in the Appendix as "machine side door", and as shown therein it is a very small piece of code, much simpler than the aforementioned compiler-scheduling code or scoreboard hardware.

If control process 1 is still controlling a render and the next command is a command such as a draw trapezoid, that command is not processed by control process 2 because two renders may not proceed on the same pipelined processing circuits at the same time without causing structural and data hazards. The data pipeline thus remains stalled as in the FIG. 4(a) case. However, as just noted, if the next command does not have data dependencies with the rendering command, it may be processed and given access to the critical resources during the phases of the system clock assigned to control process 2.

Polygon rendering in accordance with the technique of the invention proceeds as follows. If the input command is a draw trapezoid command, control process 1 instructs vector/polygon stepper 308 to read in input edge data and the like from input block 300. Vector/Polygon stepper 308 is preferably of the type described in a paper by one of the present inventors entitled "High Speed High Quality Antialiased Vector Generation", *Computer Graphics*, Volume 24, No. 4, August 1990, pp. 319-326. The calculated addresses (x,y) from Vector/Polygon stepper 308 are input into address pipe 310 and the perspective values are input into interpolator 312 (during the clock phase assigned to control process 1). Interpolator 312 calculates the pixel values based on the parameters stored in vertex register 314 when a vertex command is processed by control process 1 or control process 2. For example, such values may include red, green and blue values and a transparency value $\alpha$ for each vertex. Thus, the vertex color and transparency value and, if desired, the perspective scaling values for each pixel may be applied to the interpolator 312 for interpolation in accordance with techniques described, for example, in related U.S. patent application Ser. No. 07/493,189, filed by Swanson on Mar. 14, 1990. The interpolation techniques therein described are incorporated herein by reference. The scaled pixel parameters are then forwarded under control of interpolator PLA 316 to output formatter 318 where the scaled pixel parameters are associated with the corresponding coordinate values output form the address pipeline 310. The output of output formatter 318 is then sent to downstream hardware under control of output PLA 320 for further processing (such as dithering, gamma correction, windowing and the like) before ultimately being displayed on a display screen in accordance with known techniques.

While critical resources are being controlled by control process 1 during even (or odd) states of the system clock and control process 1 is processing a render command, control process 2 is activated during odd (or even) states of the system clock to check the next entry in the command register. If, for example, the next command is a store vertex command, control process 2 preprocesses this command, accessing critical resources during the odd (or even) states of the system clock, and stores the vertex data for the next polygon in the next vertex register 314b of vertex register 314. This process is repeated during the odd (or even) phases of the system clock until either all the vertex data has been stored in next vertex register 314b and no further commands may be preprocessed by control process 2, or the rendering of the previous polygon under control of control process 1 is completed. Once the rendering of the previous polygon has completed, the contents of the next vertex register 314b are input into the current vertex register 314a. As would be apparent to one skilled in the art, vertex register 314 may be implemented as a master/slave memory or a double buffer. The data pipeline is then ready for the next render without further delay.

When rendering is not being conducted, there is no address data to be sent from the vector/polygon stepper 308 to address pipeline 310. However, any time interpolation data is sent to interpolator 312, an indicator of some sort must be sent down the address pipeline 310 so that output formatter 318 knows that interpolated data will be coming through. In addition, the "advance even" time slot that advances the address pipeline 310 must also be used to send commands to the interpolator 312. In this manner, the addresses may be kept matched with the appropriate pixel data emerging from interpolator 312. For this reason, the interpolator 312 is advanced on odd and even cycles as shown in FIG. 2(f), except for when the pipeline is stopped.

FIGS. 2(h) and 2(j) respectively illustrate a command_set signal output to interpolator 312 during the non-rendering and rendering states of control process 1. As shown in FIG. 2(h), when control process 1 is not processing a rendering instruction, the line driver of control process 1 accesses the data bus to interpolator 312 during even clock phases. However, if a rendering instruction is being processed, FIG. 2(j) illustrates that values may still be sent to interpolator 312 by control process 2 during odd clock phases even if a pipeline stop has been issued by output formatter 318 as a result of a cache miss and the like (FIG. 2(c)). In other words, if control process 1 is performing a render and the pipeline has been stopped, control process 2 will continue to process commands from command register 306 until it reaches a command which it is not authorized to handle. At this time, it will stop processing and wait for the current rendering process to end.

FIGS. 2(g) and 2(i) illustrate how a command passthrough may be implemented in accordance with the invention. Namely, FIG. 2(g) shows that a command in command register 306 which is not to be processed by the current data pipeline may be passed through to downstream hardware during an even clock state under control of control process 1 so long as a render is not being conducted. However, as illustrated in FIG. 2(i), if a rendering instruction is being processed, no commands are sent downstream since this capability is not available to control process 2.

The invention herein described thus allows pipelined instructions to be processed out of order without losing track of the ordering and without requiring use of complex resource allocation algorithms. By using the phase of the system clock to allocate access to data buses and to specify which of two or more control processes are to control the other critical resources, resource allocation problems may be reduced to a triviality. Thus, a pipelined processing system is disclosed which allows dynamic scheduling of a pipelined processor by using a clock phase to determine which of two or more parallel control processes have control over the critical resources of the data pipeline. For example, while one primitive is being rendered, the invention allows subsequent pipeline commands to be sorted and preprocessed without disrupting the rendering process. This provides for faster pipeline execution by removing pipeline "stalls" between primitives and hence substantially improves execution time.

Although an exemplary embodiment of the invention has been described in detail above, those skilled in the art will readily appreciate that many additional modifications are possible in the exemplary embodiment without materially departing from the novel teachings and advantages of the invention. In particular, the techniques in accordance with the invention may be applied to substantially different types of commands in other processing environments besides computer graphics systems. For example, the technique of the invention may be used for determining Fourier transform coefficients since such a calculation lends itself to special purpose processing. The technique of the invention may also be used in RISC processors which are pipelined or superpipelined. Moreover, the technique of the invention may be applied to a matrix multiplier. Accordingly all such modifications are intended to be included within the scope of this invention as defined in the following claims.

```
{ X-STEPPER/CULLER CONTROL BLOCK PLADO SOURCE CODE }
{ xsource.pdo      1.24 03/30/89   Source file of logic for X-Stepper PLA
                                 **** Written By Tony Barkans ****}

CONTROL_BLOCK X_STEPPER;
           {         INPUT'S FROM PROCESSOR I/O PINS}
  INPUT    RESETX,         {RESET LINE FROM OUTSIDE CHIP}
           RESETX_2,       {SAME AS RESET}
           CLK25MHZX,      {MY MACHINES ARE SYNCED TO THE PHASE OF THIS CLK}
           C_IDX[2:0];     {THE CONFIGURATION PINS FROM OUTSIDE CHIP}

{         INPUT'S FROM EDGE STEPPER }
  INPUT    COMMAND_FULLX,  {E.S. COMMAND BUFFER IS FULL}
           COMMAND_BITX,   {E.S. IF = 1 THEN CMD IF = 0 THEN DATA IN BUFFER}
           SCAN_DECODEX,   {E.S. COMMAND IS A SCAN TYPE}
           XRT_EQ_0,       {E.S. X_RIGHT DOES NOT HAVE A FRACTION}
           XST_EQ_0,       {E.S. X_START DOES NOT HAVE A FRACTION}
           PAT_ON,         {LINE PATTERN IS ON FOR THIS PIXEL}
           YCNT_EQ_0,      {THE Y_COUNT REGISTER EQUALS 0}
           LT_CNT_MINUS,   {LINE TYPE COUNT WENT MINUS}
           HOURGLASS,      {SWAPS START AND END IF BOTTOM OF HOURGLASS}

{         INPUT'S FROM INTERPOLATOR AND OUTPUT FORMATTER}
           COM_BUSY,       {COMMAND REG IN INTERPOLATOR IS IN USE}
           PRI_DONE,       {DONE PROCESSING THE PRIMITIVE}
           STOPX,          {HALTS X-STEPPER}

{         INPUT'S FROM REGISTERS IN X-STEPPER/CULLER}
           MIN_AXIS[1:0],  {MINOR AXIS 2 LEAST SIG. ADDRESS BITS}
           MAJ_AXIS[1:0],  {Y/MAJOR AXIS 2 LEAST SIG. ADDRESS BITS}
```

```
             Y_MAJOR,         {POINTS TO MAJOR AXIS IN VECTOR MODE}
             MAJ_DECX,        {MAJOR AXIS INC OR DEC IN VECTOR MODE}
             W_FLAG,          {FLAG =1 THEN E.S. HAS GOOD W'S, ELSE USE W ROM}
             AA_MD,           {VECTOR MODE}
             TM_MODEX,        {TEXTURE MAP MODE}
             SEC_COLORX,      {SECONDARY COLOR MODE}
             NO_X_SCAN,       {OUTPUT OF COMPARATOR OF X_START AND X_END}
             X_END,           {COMPARATOR OF CURRENT_X AND X_END}
             CMDS[7:0],       {COMMAND BITS FROM TEMP COMMAD REGISTER}
             SLOPE_IN[4:0],   {2'S COMP. FORMATT OF SLOPE, USED FOR SLOPE_OUT}
             SLOPE_OUT[3:0],  {SLOPE OUT IS SAVED WHILE RENDERING}
             MINOR_SLOPE,     {PASSES MSB OF SLOPE ON TO OUTPUT}
             MSB_SLOPE;       {MSB OF SLOPE USED TO FIND SERPENTINE MODE, [5]}

{     INPUT'S DECODED FROM PROCESSOR CONFIGURATION IN SYSTEM}
INPUT        S0,              {TRUE IF CURRENT PROCESSOR OWNS SCAN LINE 0}
             S1,              {TRUE IF CURRENT PROCESSOR OWNS SCAN LINE 1}
             S2,              {TRUE IF CURRENT PROCESSOR OWNS SCAN LINE 2}
             S3,              {TRUE IF CURRENT PROCESSOR OWNS SCAN LINE 3}

{     INPUT'S USED TO KEEP TRACK OF PIPELINE EVENTS}
             FLUSH_FLAG,      {SET IN DISPATCH IF INTERPOLATOR BUSY}
             VERTEX_FLAG,     {DO NOT TELL OUTPUT ABOUT VERT'S OR THIER DATA}
             CMD_FLUSH_FLAG,  {SET WHEN FLUSH_FLAG IS SET IF FLUSHING COMMAND}
             SCAN_FLUSH_FLAG, {WHEN FLUSHING TELL OUTPUT IT'S A SCAN CMD}
             VEC_FLUSH_FLAG,  {SET DURING VECTOR FLUSH}
             PRI_FLUSH_FLAG,  {FORCES FLUSH MODE TO BE SENT TO INTERPOLATOR}
             FOUND_LINE,      {FOUND NEXT SCAN LINE DURING TRAPEZOID RENDERING}
             KEEP_GOING_1,    {LOOKING FOR NEXT SCAN LINE DURING TRAP RENDERING}
             KEEP_GOING_2,    {LOOKING FOR NEXT SCAN LINE DURING TRAP RENDERING}
             KEEP_GOING_3,    {LOOKING FOR NEXT SCAN LINE DURING TRAP RENDERING}
             NEW_SCAN_LINE,
             DELAYED_STOP,    {FOLLOWS STOP SIGNAL BY ONE CLOCK}

W_FRAC_FLAG_A,   {W_FRAC NEEDS ADD}
             W_FRAC_FLAG_B,   {W_FRAC NEEDS ADD}
             PAT_STAGE_1,     {PIPE LINE TO DELAY LINE TYPE PATTERN}
             TRANS_LT,        {LINE TYPE PATTERN IS DELAYED, SO THIS PIXEL IS ON}
             ADVANCE_PAT_1,   {ADVANCE LINE PAT ON TO MATCH PIPE LINE DELAY}
             ADVANCE_PAT_3,   {ADVANCE LINE PAT ON TO MATCH PIPE LINE DELAY}

SWAP_MODE,       {GENERATES INT MODEX[4] TO TELL INTERALATOR SWAPPED}
             SET_SWAP_MODE,   {SAVE THE STATE OF SWAP MODE FOR ENTIRE SCAN LINE}

{     INPUT'S DECODED FROM STATE INFO WHILE VECTOR STEPPING}
             OLD_SERP,        {SAVED LAST STATE OF SERP BIT}
             OLD_SERP1,       {SAVED STATE DATA}
             OLD_SERP2,       {SAVED STATE DATA}
             OLD_SERP3,       {SAVED STATE DATA}
             OLD_SERP4,       {SAVED STATE DATA}
             H_CON,           {HOLD CONTROL BIT}
             SET_SERP,        {USED TO GATE SAVING STATE OF SERP BIT}
             SET_SAVE,        {SAVE INCR, DECR, HOLD}
             SET_SAVE_1,      {SAVE INCR_1, DECR_1, HOLD_1}
             SET_SLOPE,       {SAVE THE VECTOR SLOPE IN THE PLA}
             SET_XS_FRAC,     {SAVE STAUS OF XS FRACTIONAL BITS}
             INCR_1,          {VECTOR DRAWING INCREMENT OF MINOR AXIS}
             DECR_1,          {VECTOR DRAWING DECREMENT OF MINOR AXIS}
             HOLD_1,          {VECTOR DRAWING HOLD MINOR AXIS}
             INCR,            {VECTOR DRAWING INCREMENT OF MINOR AXIS}
             DECR,            {VECTOR DRAWING DECREMENT OF MINOR AXIS}
             HOLD,            {VECTOR DRAWING HOLD MINOR AXIS}
             OLD_INCR,        {VECTOR DRAWING OLD INCREMENT OF MINOR AXIS}
             OLD_DECR,        {VECTOR DRAWING OLD DECREMENT OF MINOR AXIS}
             OLD_HOLD,        {VECTOR DRAWING OLD HOLD MINOR AXIS}
             VEC_PIXEL,       {USED TO SET LSB OF INT_MODEX WHEN RENDERING VECTORS}
             NO_XS_FRAC,      {STAUS OF XS FRACTIONAL BITS USED IN TRAP SET_UP}
             ALMOST_ADD_V,
             ALMOST_AA_ADR,
```

```
LAST_INT,                {TRACKS LAST STATE OF INT_MODES}
SET_INT,                 {SAVES LAST "INTERESTING" STATE OF INT_MODE[3]}

{       INPUT'S FROM COUNTER WHILE WAITING TO SET_MODE}
INT_MODEX[4:0], {INTERPOLATOR MODE BITS}
CNT[3:1],       {COUNTER OUTPUT BITS (NOTE BIT 0 IS NOT USED)}

{       INPUT'S USED TO TALK TO SIDE DOOR MACHINE}
SIDE_FLUSH_FLAG,        {TELLS SIDE_DOOR TO SEND A WORD TO YW}
SIDE_DOOR_CMD,          {IF SET THEN TELL YW ITS A CMD WORD}
DO_NOT_START_SIDE,      {X_STEPPER TELLING SIDE_DOOR TO HANDLE VERTEX}
SIDE_DOOR_BUSY; {SIDE_DOOOR TELLING X_STEPPER ITS HANDLING VERTEX}
STATE
        :STATIC_LOGIC;  {SIGNALS DECODED FROM PROCESSOR CONFIGURATION}
STATE
        :SAVE_VALUES;   {NEED TO STORE CURRENT STATES OF SOME BITS}
STATE
        CHECK_X_STEPPER= %000,  {WAITS UNTIL X_STEPPER IS BUSY}
        SIDE_DOOR_2    = %001,  {PASSES VERTEX COMMANDS DOWN THE PIPE}
        SIDE_DOOR_3    = %010,  {PASSES VERTEX COMMANDS DOWN THE PIPE}
        SIDE_DOOR_4    = %011,  {PASSES VERTEX COMMANDS DOWN THE PIPE}
        SIDE_DOOR_5    = %100,  {PASSES VERTEX COMMANDS DOWN THE PIPE}
        SIDE_DOOR_6    = %101:  {PASSES VERTEX COMMANDS DOWN THE PIPE}
        SIDE_DOOR;

STATE
        STARTA =                %0000000000000000000000,
        DUMMY =                 %0000000000000000000001,
        STARTB =                %0000000000000000000010,
        DISPATCH =              %0000000000000000000100,
        SEND_VERT =             %0000000000000000111000,
        SEND_VERT_WAIT=         %0000000000000000011000,

READ_MODE =             %0000000000000000101000,
        READ_MODE_WAIT =        %0000000000000000001000,
        READ_MODE_2 =           %0000000000000001001000,
        READ_MODE_3 =           %0000000000000001101000,

SET_MODE =              %0000000000000010101000,
        SET_MODE_2 =            %0000000000000010001000,
        SET_MODE_3 =            %0000000000000011001000,

DRAW_VEC_1=             %0000000000000001100000000,
        DRAW_VEC_2 =            %0000000000000000100000000,
        DRAW_VEC_3 =            %0000000000000011100000000,
        DRAW_VEC_4 =            %0000000000000010100000000,
        DRAW_VEC_5 =            %0000000000000011000000000,
        DRAW_VEC_6 =            %0000000000010100000000,
        DRAW_VEC_7 =            %0000000000110100000000,
        DRAW_VEC_STEP_1 =       %0000000000000000000000,
        DRAW_VEC_STEP_2 =       %0000000000100100000000,
        DRAW_VEC_STEP_3 =       %0000000000001100000000,
        DRAW_VEC_STEP_4 =       %0000000000101100000000,
        DRAW_VEC_FLUSH_1 =      %0000000100010000000000,
        DRAW_VEC_FLUSH_2 =      %0000000001100100000000,

DRAW_TRAP =             %0000000100000000000000,
        DRAW_TRAP_WAIT =        %0000010000000000000000,
        DRAW_TRAP_2 =           %0000001000000000000000,
        DRAW_TRAP_2X =          %0000011000000000000000,
        DRAW_TRAP_3 =           %0000100000000000000000,
        TRAP_SET_UP_EVEN =      %0001000000000000000000,
        TRAP_SET_UP_ODD =       %0010000000000000000000,
        TRAP_RENDER_EVEN =      %0100000000000000000000,
        TRAP_RENDER_ODD =       %1000000000000000000000:
        X_STEPPER;
{       OUTPUT'S DECODED FROM PROCESSOR CONFIGURATION IN SYSTEM}
OUTPUT  S0,             {TRUE IF CURRENT PROCESSOR OWNS SCAN LINE 0}
        S1,             {TRUE IF CURRENT PROCESSOR OWNS SCAN LINE 1}
```

```
S2,                {TRUE IF CURRENT PROCESSOR OWNS SCAN LINE 2}
S3,                {TRUE IF CURRENT PROCESSOR OWNS SCAN LINE 3}

{      OUTPUT'S USED TO KEEP TRACK OF PIPELINE EVENTS}
FLUSH_FLAG,        {SET IN DISPATCH IF INTERPOLATOR BUSY}
VERTEX_FLAG,       {DO NOT TELL OUTPUT ABOUT VERT'S OR THIER DATA}
CMD_FLUSH_FLAG,    {SET WHEN FLUSH FLAG IS SET IF FLUSHING COMMAND}
SCAN_FLUSH_FLAG,   {WHEN FLUSHING TELL OUTPUT IT'S A SCAN CMD}
VEC_FLUSH_FLAG,    {SET DURING VECTOR FLUSH}
PRI_FLUSH_FLAG,    {FORCES FLUSH MODE TO BE SENT TO INTERPOLATOR}
FOUND_LINE,        {FOUND NEXT SCAN LINE DURING TRAPEZOID RENDERING}
KEEP_GOING_1,      {LOOKING FOR NEXT SCAN LINE DURING TRAP RENDERING}
KEEP_GOING_2,      {LOOKING FOR NEXT SCAN LINE DURING TRAP RENDERING}
KEEP_GOING_3,      {LOOKING FOR NEXT SCAN LINE DURING TRAP RENDERING}
NEW_SCAN_LINE,
DELAYED_STOP,      {FOLLOWS STOP SIGNAL BY ONE CLOCK}

W_FRAC_FLAG_A,     {W_FRAC NEEDS ADD}
W_FRAC_FLAG_B,     {W_FRAC NEEDS ADD}

{      OUTPUT'S GENERATED FROM STATE INFO FOR VECTOR STEPPING}
OLD_SERP,          {SAVED LAST STATE OF SERP BIT}
OLD_SERP1,         {SAVED STATE DATA}
OLD_SERP2,         {SAVED STATE DATA}
OLD_SERP3,         {SAVED STATE DATA}
OLD_SERP4,         {SAVED STATE DATA}
H_CON,             {HOLD CONTROL BIT}
SET_SERP,          {GATES SAVING SERPENTINE BIT}
SET_SAVE,          {SAVE INCR, DECR, HOLD}
SET_SAVE_1,        {SAVE INCR_1, DECR_1, HOLD_1}
SET_SLOPE,         {SAVE THE VECTOR SLOPE IN THE PLA}
SET_XS_FRAC,       {SAVE STAUS OF XS FRACTIONAL BITS}
INCR,              {INCREMENT OF CURRENT X/MINOR AXIS}
DECR,              {VECTOR DRAWING DECREMENT OF MINOR AXIS}
HOLD,              {VECTOR DRAWING HOLD MINOR AXIS}
INCR_1,            {INCREMENT OF CURRENT X/MINOR AXIS}
DECR_1,            {VECTOR DRAWING DECREMENT OF MINOR AXIS}
HOLD_1,            {VECTOR DRAWING HOLD MINOR AXIS}
OLD_INCR,          {VECTOR DRAWING OLD INCREMENT OF MINOR AXIS}
OLD_DECR,          {VECTOR DRAWING OLD DECREMENT OF MINOR AXIS}
OLD_HOLD,          {VECTOR DRAWING OLD HOLD MINOR AXIS}
NO_XS_FRAC,        {STAUS OF XS FRACTIONAL BITS USED IN TRAP SET_UP}
VEC_PIXEL,
ALMOST_ADD_V,
ALMOST_AA_ADR,

{      OUTPUT'S TO COUNTER WHILE WAITING TO SET_MODE}
CNT_RESET,         {RESET THE COUNTER}
CNT_NORM,          {ALLOW COUNTER TO FREE RUN}

{      OUTPUT'S GENERATED WHILE STEPPING VECTORS OR TRAPS}
SLOPE_OUT[3:0],    {SLOPE OUT TO AA ROM ADDRESS REGISTER}
ADD_VALID,         {CURRENT PIXEL DATA IS VALID}

EOS,               {END OF SPAN}
VECTOR_TRAP,       {TELLS OUTPUT IF PIXEL IS PART OF VECTOR OR TRAP}
PIPE_LOCAL,        {TELLS OUTPUT IF COMMAND IS IN PIPE}
MAJOR_Y,           {PASSES Y_MAJ BIT ON TO OUTPUT}
MAJOR_DEC,         {PASSES MAJ_DECX ON TO OUTPUT}
MINOR_SLOPE,       {PASSES MSB OF SLOPE ON TO OUTPUT}
PAT_STAGE_1,       {PIPE LINE TO DELAY LINE TYPE PATTERN}
TRANS_LT,          {LINE TYPE PATTERN IS DELAYED, SO THIS PIXEL IS ON}
ADVANCE_PAT_1,     {ADVANCE LINE PAT_ON TO MATCH PIPE LINE DELAY}
ADVANCE_PAT_3,     {ADVANCE LINE PAT_ON TO MATCH PIPE LINE DELAY}

SWAP_MODE,         {GENERATES INT_MODEX[4] TO TELL INTERALATOR SWAPPED}
SET_SWAP_MODE,     {SAVE THE STATE OF SWAP MODE FOR ENTIRE SCAN LINE}

{      OUTPUT'S THAT CONTROL REGISTER SET IN X-STEPPER/CULLER}
CUR_Y_LD_Y_BUS,    {LOAD CURRENT_Y/MAJOR REGISTER FROM Y_BUS}
CUR_Y_LD_INCR,     {INC CURRENT_Y/MAJOR VALUE}
CUR_Y_LD_DECR,     {DEC CURRENT_Y/MAJOR VALUE}
```

```
CUR_MAJ_LD,        {LOAD THE CURRENT MAJOR AXIS REGISTER}
CUR_MAJ_NDUMP,     {DUMP THE CURENT MAJOR AXIS REGISTER}

XS_LD_CMD_BUS,     {LOAD X_START REGISTER FROM CMD BUS}
XS_LD_Y_BUS,       {LOAD X_START REG FROM Y_BUS}
XS_NDUMP,          {DUMP THE X_START REGISTER}

CUR_X_LD_XS,       {LOAD CURRENT_X/MINOR REGISTER FROM X_START}
CUR_X_LD_XS_INCR,  {LOAD CURRENT_X/MINOR REGISTER FROM ADJUST}
CUR_X_NDUMP,       {DUMP CURRENT_X/MINOR REGISTER TO BUS}
CUR_X_LD_INCR,     {INC CURRENT_X/MINOR VALUE}
CUR_X_LD_DECR,     {DEC CURRENT_X/MINOR VALUE}

ADD_LD_X_X,        {LOAD ADDRESS REG X FROM X/MINOR}
ADD_LD_X_Y,        {LOAD ADDRESS REG X FROM Y/MAJOR}
ADD_LD_Y_X,        {LOAD ADDRESS REG Y FROM X/MINOR}
ADD_LD_Y_Y,        {LOAD ADDRESS REG Y FROM Y/MAJOR}
ADD_NDUMP,         {DUMP ADDRESS REGISTER TO BUS}

XE_LD_Y_BUS,       {LOAD X_END REGISTER FROM Y_BUS}
XE_LD_CMD_BUS,     {LOAD X_END REG FROM CMD BUS}
XE_NDUMP,          {DUMP THE X_END REGISTER}

W_REGS_LD_1,       {LOAD WS REG FROM W1 BUS AND WE FROM W2 BUS}
W_REGS_LD_2,       {LOAD WS REG FROM W2 BUS AND WE FROM W1 BUS}
WS_NDUMP,          {DUMP THE W_START REGISTER}
WE_NDUMP,          {DUMP THE W_END REGISTER}
W_NDUMP,
W_ROM_NDUMP,       {DUMP ROM OUT FOR W VALUES}
CUR_CMD_LD,        {LOAD CURRENT COMMAND REGISTER}
TEMP_CMD_LD,       {LOAD TEMP COMMAND REGISTER}
TEMP_CMD_NDUMP,    {DUMP THE TEMP COMMAND REGISTER}
MODE_REG_LD,       {LOAD THE MODE REGISTER}
MODE_REG_NDUMP,    {DUMP THE MODE REGISTER}
FRAC_REG_LD,       {LOAD THE FRACTIONAL POSITION INTO ITS REGISTER}

{       OUTPUT'S TO AA VECTOR BLOCK}

AA_ROM_BANK[1:0],  {THE HIGH ORDER ADDRESS BITS TO THE AA ROM
                    00 = BOTTOM AA PIXEL
                    01 = MIDDLE AA PIXEL
                    10 = TOP AA PIXEL
                    11 = ALIASED PIXEL}

{       OUTPUT'S TO EDGE STEPPER}
IN_BUFFER_TAKEN,   {TELL E.S. INPUT BUFFER MOVED TO EDGE STEPPER}
SFT_ES_A_IN,       {TRANSFERS THE A DATA FROM INPUT BUFFER TO E.S.}
SFT_ES_B_IN,       {TRANSFERS THE B DATA FROM INPUT BUFFER TO E.S.}
SFT_ES_COUNT_IN,   {TRANSFER COUNT FROM INPUT BUFFER TO E.S.}
COMMAND_TAKEN,     {TELL E.S. CMD BUFF DUMPED ONTO CMD BUS}
ES_RESET,          {RESETS THE E.S. REGISTERS}
D_CMD_X,           {DUMP E.S. COMMAND REGISTER}
D_XST_X,           {DUMP E.S. X_START REGISTER}
D_YSL_X,           {DUMP E.S. Y_SLOPE REGISTER}
D_XRT_Y,           {DUMP E.S. X_RIGHT REGISTER}
D_YST_Y,           {DUMP E.S. Y_START REGISTER}
S_LT_DEC,          {LINE TYPE DECREMENT}
S_LTP_SFT,         {SHIFT THE LINE TYPE PATTERN}
RESET_LINETYPE,    {LOADS NEW PATTERN AND COUNT INTO E.S.}
S_WF_ADD,          {ADD W FRAC (A SIDE)}
S_WFRT_ADD,        {ADD W FRAC (B SIDE)}
ES_STEP,           {TELLS E.S. TO STEP}

{       OUTPUT'S TO INTERPOLATOR STACK}
INT_MODEX[4:0],    {INTERPOLATOR MODE BITS}
XS_SET,            {LOADS XS REG IN YW STACK}
XE_SET,            {LOADS XS REG IN YW STACK}
COM_SET,           {LOADS COMMAND REGISTER IN YW STACK}
COM_LD,            {TELLS INTERPOLATOR PLA THAT COMMAND WAS LOADED}
DATA_LD,           {TELLS INTERPOLATOR PLA THAT DATA WAS LOADED}
```

```
        {       OUTPUT'S USED TO TALK TO SIDE DOOR MACHINE}
    SIDE_FLUSH_FLAG,        {TELLS SIDE_DOOR TO SEND A WORD TO YW}
    SIDE_DOOR_CMD,          {IF SET THEN TELL YW ITS A CMD WORD}
    DO_NOT_START_SIDE,      {X_STEPPER TELLING SIDE_DOOR TO HANDLE VERTEX}
    SIDE_DOOR_BUSY, {SIDE_DOOOR TELLING X_STEPPER ITS HANDLING VERTEX}

{    - OUTPUT USED TO ADDRESS PIPE AND DATA IN SYNC}
    LAST_INT,               {TRACKS LAST STATE OF INT_MODES}
    SET_INT,                {SAVES LAST "INTERESTING" STATE OF INT_MODE[3]}
    ADV_EVEN_PIPE,          {ADVANCE ADDRESS PIPES}
    ADV_ODD_PIPE,           {ADVANCE AA ROM}
    ADV_XY_PIPE,            {ADVANCE AA ROM}
    EVEN_L,                 {ADVANCE AA ROM}
    EVEN_R,                 {ADVANCE AA ROM}
    ODD,                    {ADVANCE AA ROM}
    LATCH_ROM,              {ADVANCE AA ROM}
    ADV_BYPASS,             {BYPASS TOP OF X Y PIPE}
    ADV_NORM,               {ADVANCE TOP OF X Y PIPE}
    ADV_PIPE_L,             {ADVANCE THE INTERPOLATOR PIPE}
    ADV_PIPE_R,             {ADVANCE THE INTERPOLATOR PIPE}
    DADV_PIPE,              {ADVANCE THE INTERPOLATOR PIPE}
    DADV_PIPE1;             {ADVANCE THE INTERPOLATOR PIPE}

{ DEFINE MODES (USED TO CONTROL INTERPOLATOR) }

%define MODE_L1 14
            {POLYGON LEFT SET UP}
%define MODE_L2 10
            {POLYGON LEFT SET UP}
%define MODE_L3 11
            {POLYGON LEFT SET UP}
%define MODE_R1 12
            {POLYGON RIGHT SET UP}
%define MODE_R2 8
            {POLYGON RIGHT SET UP}
%define MODE_R3 9
            {POLYGON RIGHT SET UP}
%define MODE_P1 6
            {POLYGON PIXEL}
%define MODE_P2 2
            {POLYGON PIXEL}
%define MODE_P3 3
            {POLYGON PIXEL}
%define MODE_VP 5
            {PIXEL OF VECTOR *** NOTE: USED INT_MODEX[2] AND VEC_PIXEL}
%define MODE_FLUSH 1
            {END OF EACH PRIMITIVE *** NOTE: USED PRI_FLUSH_FLAG}

{*****************************************************************
****                                                           ****
****                 MACHINE STATIC_LOGIC                      ****
****                                                           ****
*****************************************************************}

MACHINE STATIC_LOGIC;
    BEGIN
        S0 := (~C_IDX[2]*~C_IDX[1]*~C_IDX[0]) +
              (~C_IDX[2]*C_IDX[1]*~C_IDX[0]) +
              (C_IDX[2]*~C_IDX[1]*~C_IDX[0]);
        S1 := (~C_IDX[2]*~C_IDX[1]*~C_IDX[0]) +
              (~C_IDX[2]*C_IDX[1]*C_IDX[0]) +
              (C_IDX[2]*~C_IDX[1]*C_IDX[0]);
        S2 := (~C_IDX[2]*~C_IDX[1]*~C_IDX[0]) +
              (~C_IDX[2]*C_IDX[1]*~C_IDX[0]) +
              (C_IDX[2]*C_IDX[1]*~C_IDX[0]);
        S3 := (~C_IDX[2]*~C_IDX[1]*~C_IDX[0]) +
              (~C_IDX[2]*C_IDX[1]*C_IDX[0]) +
              (C_IDX[2]*C_IDX[1]*C_IDX[0]);

END;    {END OF MACHINE STATIC LOGIC}
```

```
{******************************************************************
****                                                            ****
****                  MACHINE SAVE_VALUES                       ****
****                                                            ****
*******************************************************************}

MACHINE SAVE_VALUES;
    BEGIN                           {SAVE STATE INFORMANTION}
        OLD_SERP  := ((MSB_SLOPE*SET_SLOPE) + (~OLD_SERP*SET_SERP) +
                      (OLD_SERP*~SET_SLOPE*~SET_SERP));
        OLD_SERP1 := ((((~MSB_SLOPE*AA_MD)+(C_IDX[2]*AA_MD))*SET_SLOPE) +
                      (((~OLD_SERP*AA_MD)+(C_IDX[2]*AA_MD))*SET_SERP) +
                      (OLD_SERP1 * ~SET_SLOPE * ~SET_SERP));
        OLD_SERP2 := ((MSB_SLOPE*AA_MD*SET_SLOPE) +
                      (~OLD_SERP*AA_MD*SET_SERP) +
                      (OLD_SERP2 * ~SET_SLOPE * ~SET_SERP));
        OLD_SERP3 := ((((~MSB_SLOPE*AA_MD)+(C_IDX[2]*AA_MD))*SET_SLOPE) +
                      (((OLD_SERP*AA_MD)+(C_IDX[2]*AA_MD))*SET_SERP) +
                      (OLD_SERP3 * ~SET_SLOPE * ~SET_SERP));
        OLD_SERP4 := ((~MSB_SLOPE*AA_MD*SET_SLOPE) +
                      (OLD_SERP*AA_MD*SET_SERP) +
                      (OLD_SERP4 * ~SET_SLOPE * ~SET_SERP));

OLD_INCR := (INCR*SET_SAVE) + (OLD_INCR*~SET_SAVE*~SET_SAVE_1) +
                    (INCR_1*SET_SAVE_1);
        OLD_DECR := (DECR*SET_SAVE) + (OLD_DECR*~SET_SAVE*~SET_SAVE_1) +
                    (DECR_1*SET_SAVE_1);
        OLD_HOLD := (HOLD*SET_SAVE) + (OLD_HOLD*~SET_SAVE*~SET_SAVE_1) +
                    (HOLD_1*SET_SAVE_1);
        H_CON := (C_IDX[2] + C_IDX[1] +
                  (~C_IDX[2]*~C_IDX[1]*~AA_MD));   {STATIC PER VECTOR}

SLOPE_OUT[0] := ((((~MSB_SLOPE*SLOPE_IN[0]) +
                          (MSB_SLOPE*~SLOPE_IN[0]) +
                          (~MSB_SLOPE*SLOPE_IN[4]))*SET_SLOPE) +
                          (SLOPE_OUT[0] * ~SET_SLOPE));
        SLOPE_OUT[1] := ((((~MSB_SLOPE*SLOPE_IN[1]) +
                          (MSB_SLOPE*~SLOPE_IN[1]) +
                          (~MSB_SLOPE*SLOPE_IN[4]))*SET_SLOPE) +
                          (SLOPE_OUT[1] * ~SET_SLOPE));
        SLOPE_OUT[2] := ((((~MSB_SLOPE*SLOPE_IN[2]) +
                          (MSB_SLOPE*~SLOPE_IN[2]) +
                          (~MSB_SLOPE*SLOPE_IN[4]))*SET_SLOPE) +
                          (SLOPE_OUT[2] * ~SET_SLOPE));
        SLOPE_OUT[3] := ((((~MSB_SLOPE*SLOPE_IN[3]) +
                          (MSB_SLOPE*~SLOPE_IN[3]) +
                          (~MSB_SLOPE*SLOPE_IN[4]))*SET_SLOPE) +
                          (SLOPE_OUT[3] * ~SET_SLOPE));

PAT_STAGE_1 := ((PAT_ON * ADVANCE_PAT_1) +
                        (PAT_STAGE_1 * ~ ADVANCE_PAT_1));
        TRANS_LT := ((~PAT_STAGE_1*ADVANCE_PAT_3) +
                     (TRANS_LT*~ADVANCE_PAT_3));

ALMOST_ADD_V := OLD_INCR + OLD_DECR + OLD_HOLD;

ALMOST_AA_ADR :=   {**[TOP/MID PIXEL]= ((OLD_STEP*OLD_DECR)+
                                               (~OLD_STEP*OLD_INCR) + ~AA_MD **}
                        (((((OLD_INCR + OLD_DECR)*Y_MAJOR) +
                           ((OLD_INCR+OLD_DECR)*~C_IDX[2]*~Y_MAJOR))*OLD_DECR) +
                         (~(((OLD_INCR + OLD_DECR)*Y_MAJOR) +
                           ((OLD_INCR+OLD_DECR)*~C_IDX[2]*~Y_MAJOR))*OLD_INCR) +

~AA_MD);

NO_XS_FRAC := ((((~HOURGLASS*XST_EQ_0) + (HOURGLASS*XRT_EQ_0)) *
                        SET_XS_FRAC) +
                       (NO_XS_FRAC * ~SET_XS_FRAC));
```

```
INCR := ((~DELAYED_STOP*((((~MIN_AXIS[1]*~MIN_AXIS[0]*S1) +
    (~MIN_AXIS[1]*MIN_AXIS[0]*S2) +
    (MIN_AXIS[1]*~MIN_AXIS[0]*S3) +
    (MIN_AXIS[1]*MIN_AXIS[0]*S0))* OLD_SERP1 * ~Y_MAJOR) +
    ((((~MAJ_AXIS[1]*MAJ_AXIS[0]*MAJ_DECX*S0) +
    (MAJ_AXIS[1]*MAJ_AXIS[0]*~MAJ_DECX*S0)) +
    ((MAJ_AXIS[1]*~MAJ_AXIS[0]*MAJ_DECX*S1) +
    (~MAJ_AXIS[1]*~MAJ_AXIS[0]*~MAJ_DECX*S1)) +
    ((MAJ_AXIS[1]*MAJ_AXIS[0]*MAJ_DECX*S2) +
    (~MAJ_AXIS[1]*MAJ_AXIS[0]*~MAJ_DECX*S2)) +
    ((~MAJ_AXIS[1]*~MAJ_AXIS[0]*MAJ_DECX*S3) +
    (MAJ_AXIS[1]*~MAJ_AXIS[0]*~MAJ_DECX*S3)))*OLD_SERP2*Y_MAJOR)))+
    (INCR * DELAYED_STOP));
DECR := ((~DELAYED_STOP*(((((~MIN_AXIS[1]*~MIN_AXIS[0])*S3) +
    ((~MIN_AXIS[1]*MIN_AXIS[0])*S0) +
    ((MIN_AXIS[1]*~MIN_AXIS[0])*S1) +
    ((MIN_AXIS[1]*MIN_AXIS[0])*S2))* OLD_SERP3 * ~Y_MAJOR) +
    ((((~MAJ_AXIS[1]*MAJ_AXIS[0]*MAJ_DECX*S0) +
    (MAJ_AXIS[1]*MAJ_AXIS[0]*~MAJ_DECX*S0)) +
    ((MAJ_AXIS[1]*~MAJ_AXIS[0]*MAJ_DECX*S1) +
    (~MAJ_AXIS[1]*~MAJ_AXIS[0]*~MAJ_DECX*S1)) +
    ((MAJ_AXIS[1]*MAJ_AXIS[0]*MAJ_DECX*S2) +
    (~MAJ_AXIS[1]*MAJ_AXIS[0]*~MAJ_DECX*S2)) +
    ((~MAJ_AXIS[1]*~MAJ_AXIS[0]*MAJ_DECX*S3) +
    (MAJ_AXIS[1]*~MAJ_AXIS[0]*~MAJ_DECX*S3)))*OLD_SERP4*Y_MAJOR)))+
    (DECR * DELAYED_STOP));
HOLD := ((~DELAYED_STOP*(((((~MIN_AXIS[1]*~MIN_AXIS[0])*S0) +
    ((~MIN_AXIS[1]*MIN_AXIS[0])*S1) +
    ((MIN_AXIS[1]*~MIN_AXIS[0])*S2) +
    ((MIN_AXIS[1]*MIN_AXIS[0])*S3))* H_CON * ~Y_MAJOR) +
    ((((~MAJ_AXIS[1]*MAJ_AXIS[0]*MAJ_DECX*S0) +
    (MAJ_AXIS[1]*MAJ_AXIS[0]*~MAJ_DECX*S0)) +
    ((MAJ_AXIS[1]*~MAJ_AXIS[0]*MAJ_DECX*S1) +
    (~MAJ_AXIS[1]*~MAJ_AXIS[0]*~MAJ_DECX*S1)) +
    ((MAJ_AXIS[1]*MAJ_AXIS[0]*MAJ_DECX*S2) +
    (~MAJ_AXIS[1]*MAJ_AXIS[0]*~MAJ_DECX*S2)) +
    ((~MAJ_AXIS[1]*~MAJ_AXIS[0]*MAJ_DECX*S3) +
    (MAJ_AXIS[1]*~MAJ_AXIS[0]*~MAJ_DECX*S3)))*~AA_MD*Y_MAJOR))+
    (HOLD * DELAYED_STOP));

INCR_1 := ((((~MIN_AXIS[1]*~MIN_AXIS[0]*S1) +
    (~MIN_AXIS[1]*MIN_AXIS[0]*S2) +
    (MIN_AXIS[1]*~MIN_AXIS[0]*S3) +
    (MIN_AXIS[1]*MIN_AXIS[0]*S0))* OLD_SERP1 * ~Y_MAJOR) +
    (((~MAJ_AXIS[1]*~MAJ_AXIS[0]*S0) +
    (~MAJ_AXIS[1]*MAJ_AXIS[0]*S1) +
    (MAJ_AXIS[1]*~MAJ_AXIS[0]*S2) +
    (MAJ_AXIS[1]*MAJ_AXIS[0]*S3))*OLD_SERP2*Y_MAJOR));
DECR_1 := (((((~MIN_AXIS[1]*~MIN_AXIS[0])*S3) +
    ((~MIN_AXIS[1]*MIN_AXIS[0])*S0) +
    ((MIN_AXIS[1]*~MIN_AXIS[0])*S1) +
    ((MIN_AXIS[1]*MIN_AXIS[0])*S2))* OLD_SERP3 * ~Y_MAJOR) +
    (((~MAJ_AXIS[1]*~MAJ_AXIS[0]*S0) +
    (~MAJ_AXIS[1]*MAJ_AXIS[0]*S1) +
    (MAJ_AXIS[1]*~MAJ_AXIS[0]*S2) +
    (MAJ_AXIS[1]*MAJ_AXIS[0]*S3))*OLD_SERP4*Y_MAJOR));
HOLD_1 := (((((~MIN_AXIS[1]*~MIN_AXIS[0])*S0) +
    ((~MIN_AXIS[1]*MIN_AXIS[0])*S1) +
    ((MIN_AXIS[1]*~MIN_AXIS[0])*S2) +
    ((MIN_AXIS[1]*MIN_AXIS[0])*S3))* H_CON * ~Y_MAJOR) +
    (((~MAJ_AXIS[1]*~MAJ_AXIS[0]*S0) +
    (~MAJ_AXIS[1]*MAJ_AXIS[0]*S1) +
    (MAJ_AXIS[1]*~MAJ_AXIS[0]*S2) +
    (MAJ_AXIS[1]*MAJ_AXIS[0]*S3))*~AA_MD*Y_MAJOR));

MAJOR_Y   := Y_MAJOR;   {PASS THROUGH TO OUTPUT FORMATTER}
MAJOR_DEC := MAJ_DECX;  {PASS THROUGH TO OUTPUT FORMATTER}
MINOR_SLOPE := ((MSB_SLOPE*SET_SLOPE) +
    (MINOR_SLOPE*~SET_SLOPE));   {PASS THROUGH TO OUTPUT FORMATTER}
```

```
        ES_RESET := RESETX;

ADV_EVEN_PIPE := CLK25MHZX*~STOPX;
        ADV_ODD_PIPE := ~CLK25MHZX*~STOPX;
        ADV_XY_PIPE := ~CLK25MHZX*~STOPX + RESETX;
        EVEN_L := CLK25MHZX*~STOPX;
        EVEN_R := CLK25MHZX*~STOPX;
        ODD := ~CLK25MHZX*~STOPX;
        LATCH_ROM := CLK25MHZX*~STOPX;
        ADV_PIPE_L := ~STOPX + RESETX;
        ADV_PIPE_R := ~STOPX + RESETX;
        DADV_PIPE := ~STOPX;
        DADV_PIPE1 := ~STOPX;

DELAYED_STOP := STOPX;        {DELAY STOP FOR ONE EXTRA CLOCK}

INT_MODEX[0] := PRI_FLUSH_FLAG + VEC_PIXEL;

INT_MODEX[4] := ((SWAP_MODE * SET_SWAP_MODE) +
                        (INT_MODEX[4] * ~SET_SWAP_MODE));

ADV_NORM := RESETX;           {LOGIC TO SWAP TOP OF X Y PIPE}

LAST_INT := ((~INT_MODEX[3] * SET_INT) +
                    (LAST_INT * ~SET_INT));

IF (~CLK25MHZX*~STOPX) THEN
           IF (LAST_INT * INT_MODEX[3] * INT_MODEX[0]) THEN
                BEGIN
                ADV_BYPASS;
                EOS;                  {TELL OUT PUT THERE IS A BUBBLE}
                END
              ELSE
                BEGIN

ADV_NORM;
                SET_INT;
                END;

END;    {END OF MACHINE SAVE_VALUES}
{***********************************************************************
****                                                                 ****
****                    MACHINE X_STEPPER                            ****
****                                                                 ****
***********************************************************************}

MACHINE X_STEPPER;
        BEGIN
        IF RESETX THEN
           BEGIN
           ?FLUSH_FLAG;
           ?VERTEX_FLAG;
           ?CMD_FLUSH_FLAG;
           ?SCAN_FLUSH_FLAG;
           ?VEC_FLUSH_FLAG;
           ?PRI_FLUSH_FLAG;
           ?FOUND_LINE;
           ?KEEP_GOING_1;
           ?KEEP_GOING_2;
           ?KEEP_GOING_3;
           ?NEW_SCAN_LINE;
           ?W_FRAC_FLAG_A;
           ?W_FRAC_FLAG_B;
           ?SET_SERP;
           ?SET_SAVE;
           ?SET_SAVE_1;
           ?SET_SLOPE;
           ?VEC_PIXEL;
           ?CNT_RESET;
```

```
                ?CNT_NORM;
                ?ADD_VALID;
                ?EOS;
                ?VECTOR_TRAP;
                ?PIPE_LOCAL;
                ?ADVANCE_PAT_1;
                ?ADVANCE_PAT_3;
                ?CUR_Y_LD_Y_BUS;
                ?CUR_Y_LD_INCR;
                ?CUR_Y_LD_DECR;
                ?CUR_MAJ_LD;
                ?CUR_MAJ_NDUMP;
                ?XS_LD_CMD_BUS;
                ?XS_LD_Y_BUS;
                ?XS_NDUMP;
                ?CUR_X_LD_XS;
                ?CUR_X_LD_XS_INCR;
                ?CUR_X_NDUMP;
                ?CUR_X_LD_INCR;
                ?CUR_X_LD_DECR;
                ?ADD_LD_X_X;
                ?ADD_LD_X_Y;
                ?ADD_LD_Y_X;
                ?ADD_LD_Y_Y;
                ?ADD_NDUMP;
                ?XE_LD_Y_BUS;
                ?XE_LD_CMD_BUS;
                ?XE_NDUMP;
                ?W_REGS_LD_1;
                ?W_REGS_LD_2;
                ?WS_NDUMP;
                ?WE_NDUMP;
                ?W_NDUMP;
                ?W_ROM_NDUMP;
                ?CUR_CMD_LD;
                ?TEMP_CMD_LD;
                ?TEMP_CMD_NDUMP;
                ?MODE_REG_LD;
                ?MODE_REG_NDUMP;
                ?FRAC_REG_LD;
                ?AA_ROM_BANK[1];
                ?AA_ROM_BANK[0];
                ?IN_BUFFER_TAKEN;
                ?SFT_ES_A_IN;
                ?SFT_ES_B_IN;
                ?SFT_ES_COUNT_IN;
                ?D_CMD_X;
                ?D_XST_X;
                ?D_YSL_X;
                ?D_XRT_Y;
                ?D_YST_Y;
                ?S_LT_DEC;
                ?S_LTP_SFT;
                ?RESET_LINETYPE;
                ?S_WF_ADD;
                ?S_WFRT_ADD;
                ?ES_STEP;
                ?INT_MODEX[3];
                ?INT_MODEX[2];
                ?INT_MODEX[1];
                ?XS_SET;
                ?XE_SET;
                ?COM_SET;
                ?COM_LD;
                ?DATA_LD;
                NEXT_STATE DUMMY;
            END
        ELSE
            CASE PRESENT_STATE OF
            DUMMY:                         {USED ON POWER UP }
                BEGIN
```

```
            DO_NOT_START_SIDE;
            NEXT_STATE STARTA;
            END;

STARTA:
         BEGIN       {STARTA}       {THIS IS AN EVEN STATE}

IF (VERTEX_FLAG) THEN VERTEX_FLAG;
IF (PRI_FLUSH_FLAG) THEN PRI_FLUSH_FLAG;
DO_NOT_START_SIDE; {DO NOT LET SIDE DOOR MACHINE RUN}
IF (STOPX + ~CLK25MHZX) THEN       {GET IN SYNC TO START}
   BEGIN
   IF (CMD_FLUSH_FLAG) THEN CMD_FLUSH_FLAG;
   IF (FLUSH_FLAG) THEN
      BEGIN
      FLUSH_FLAG;
      IF (SCAN_FLUSH_FLAG) THEN SCAN_FLUSH_FLAG;
      END;
   NEXT_STATE STARTA;
   END
ELSE
  BEGIN
  IF (FLUSH_FLAG) THEN
     BEGIN
     FLUSH_FLAG := 1;
     IF (CMD_FLUSH_FLAG) THEN CMD_FLUSH_FLAG;
     IF (SCAN_FLUSH_FLAG) THEN SCAN_FLUSH_FLAG;
     NEXT_STATE STARTB;      {LOOP UNTIL IT CAN BE SENT}
     END
   ELSE
     BEGIN
     IF (COMMAND_FULLX*~SIDE_DOOR_BUSY) THEN
        BEGIN
        D_CMD_X;     {DUMP E.S. CMD REG TO CMD BUS}
        TEMP_CMD_LD;        {LOAD TEMP CMD REG}
        COMMAND_TAKEN;      {TELL EDGE STEPPER COMMAND TAKEN}
        NEXT_STATE DISPATCH;              {SEE IF IT'S FOR ME}
        END
      ELSE
        BEGIN {COMMAND NOT READY, GOTO STATRB TO SYNC TO CLK25MHZX}
        NEXT_STATE STARTB;
        END;
     END;                    {END OF ELSE FLUSH_FLAG*COM_BUSY}
   END;
END; {STARTA}

STARTB:
    BEGIN                    {THIS IS AN ODD STATE}
    DO_NOT_START_SIDE;       {DO NOT LET SIDE DOOR MACHINE RUN}
    IF (VERTEX_FLAG) THEN VERTEX_FLAG; {IF SET THEN KEEP IT SET}
    IF (FLUSH_FLAG*~COM_BUSY*~SIDE_DOOR_BUSY) THEN
       BEGIN      {FLUSH COMMAND}
       TEMP_CMD_NDUMP;
       IF (~VERTEX_FLAG) THEN {DON'T TELL OUTPUT ABOUT VERTS}
       PIPE_LOCAL := 1;    {TELL OUTPUT THAT SOMETHING IN PIPE}
       COM_SET;              {SET REGISTER IN YW STACK}
       IF (SCAN_FLUSH_FLAG) THEN VECTOR_TRAP;
       IF (CMD_FLUSH_FLAG) THEN
          COM_LD              {TELL PLA COMMAND WAS LOADED}
       ELSE
          DATA_LD;            {TELL PLA DATA WAS LOADED}
       NEXT_STATE STARTA;
       END
  ELSE
    BEGIN
    IF (FLUSH_FLAG) THEN FLUSH_FLAG;     {IF SET THEN KEEP IT SET}
    IF (CMD_FLUSH_FLAG) THEN CMD_FLUSH_FLAG;
```

```
            IF (SCAN_FLUSH_FLAG) THEN SCAN_FLUSH_FLAG;
            NEXT_STATE STARTA;
            END;
        END;

DISPATCH:
        BEGIN                          {THIS IS AN ODD STATE}
        DO_NOT_START_SIDE;  {DO NOT LET SIDE DOOR MACHINE RUN}
        IF (VEC_FLUSH_FLAG) THEN
            BEGIN
            INT_MODEX[2];
            PRI_FLUSH_FLAG;
            ADD_VALID := ALMOST_ADD_V;
            VECTOR_TRAP := 1;         {TELL OUTPUT IT'S A VECTOR PIXEL}
            AA_ROM_BANK[1] := ALMOST_AA_ADR;
            AA_ROM_BANK[0] := ~AA_MD + OLD_HOLD;
            ADD_NDUMP;                   {DUMP ADDRESS TO BUS}
            CUR_MAJ_NDUMP;          {SEND CURRENT MAJ TO INTERPOLATOR}
            EOS := 1;                    {FORCE END OF PRIMATIVE}
            PIPE_LOCAL := 1;             {EOS * PIPE = EOP}
            END;
        IF (COMMAND_BITX) THEN
            BEGIN
            IF ((~COM_BUSY * ~VEC_FLUSH_FLAG) *
                !(~CMDS[7]*~CMDS[6]*CMDS[5]*~CMDS[4]*
                    ~CMDS[3]*~CMDS[2]*SCAN_DECODEX)) THEN
                                         {EAT SET DRAW MODE}
                BEGIN                    {DUMP CMD REG TO CXY BUS}
                TEMP_CMD_NDUMP;
                COM_SET;
                COM_LD;
                END
            ELSE
                BEGIN
                FLUSH_FLAG;              {SET IN CASE OF GOTO STARTA OR VEC_2}
                CMD_FLUSH_FLAG;
                END;
            END;
        IF (COMMAND_BITX*SCAN_DECODEX) THEN        {PROCESS COMMAND}
            BEGIN
            IF (~CMDS[7]*~CMDS[6]*~CMDS[5]*CMDS[4]) THEN
                BEGIN                    {PROCESSING 4 TYPES OF TRAPS}
                SFT_ES_COUNT_IN;         {MOVE NEW COUNT INTO E.S.}
                IN_BUFFER_TAKEN;         {TELL E.S. DATA IS MOVED}
                CUR_CMD_LD;              {LOAD THE CURRENT COMMAND REG}
                IF (~CMDS[3]) THEN
                    BEGIN
                    D_YST_Y;             {DUMP Y START TO Y BUS}
                    CUR_Y_LD_Y_BUS;      {LOAD MY CURRENT Y REGISTER}
                        IF (CMDS[1]) THEN           {NEW_A_TRAP}
                            BEGIN
                            SFT_ES_A_IN;            {MOVE IN BUFFER A TO STEPPER}

W_FRAC_FLAG_A;           { NEW FRAC A WAS LOADED}
            END;
        IF (CMDS[0]) THEN           {NEW_B_TRAP}
            BEGIN
            SFT_ES_B_IN;            {MOVE IN BUFFER A TO STEPPER}
            W_FRAC_FLAG_B;          { NEW FRAC B WAS LOADED}
            END;
        IF (~COM_BUSY * ~VEC_FLUSH_FLAG) THEN
            BEGIN
            NEXT_STATE DRAW_TRAP_2;
            END
        ELSE
            NEXT_STATE DRAW_TRAP_WAIT;    {LOOP}
        END;
    IF (CMDS[3]) THEN               {VECTOR COMMAND}
```

```
BEGIN
    D_YSL_X;                    {DUMP THE Y_SLOPE REG FROM E.S.}
    SET_SLOPE := 1;             {SET SLOPE AND FIRST SERP'S}
    IF (~CMDS[0]) THEN RESET_LINETYPE;
    SFT_ES_A_IN;                {MOVE IN BUFFER TO STEPPER}
    SFT_ES_B_IN;
    IF (VEC_FLUSH_FLAG) THEN
        VEC_FLUSH_FLAG;         {DON'T DO 2 TEMP_CMD_NDUMPS}
    NEXT_STATE DRAW_VEC_2;
    END
END
ELSE IF (~CMDS[7]*~CMDS[6]*CMDS[5]*~CMDS[4]*
         ~CMDS[3]*~CMDS[2]*~CMDS[1]*~CMDS[0]) THEN
    BEGIN                       {SET_MODE}
    CNT_RESET := 1;
    CNT_NORM := 1;              {RESET SET_MODE COUNTER}
    NEXT_STATE SET_MODE_2;
    END
ELSE IF (~CMDS[7]*~CMDS[6]*CMDS[5]*~CMDS[4]*CMDS[3]) THEN
    BEGIN                       {SET_VERT ETC. (NON_PIPE)}
    IF (COM_BUSY + VEC_FLUSH_FLAG) THEN
        NEXT_STATE SEND_VERT_WAIT    {LOOP}
    ELSE
        BEGIN
        VERTEX_FLAG := 1;       {NEXT DATA IS EATEN BY VERT CMD}
        NEXT_STATE STARTA;
        END;
    END
ELSE IF (CMDS[7]*CMDS[6]*~CMDS[5]*~CMDS[4]*
         CMDS[3]*~CMDS[0]) THEN
    BEGIN
    IF (~COM_BUSY * ~VEC_FLUSH_FLAG) THEN
        BEGIN
        VECTOR_TRAP;
        PIPE_LOCAL := 1;        {TELL OUTPUT SOMETHING IN PIPE}
        NEXT_STATE READ_MODE_2;
        END
    ELSE
        NEXT_STATE READ_MODE_WAIT;   {LOOP}
    END
ELSE                            {PASS THROUGH COMMAND}

BEGIN
    SCAN_FLUSH_FLAG;    {FOR OUTPUT FORMATTER}
    IF (~COM_BUSY * ~VEC_FLUSH_FLAG) THEN
        BEGIN
        VECTOR_TRAP := 1;       {TELL OUTPUT IT'S A SCAN CMD}
        PIPE_LOCAL := 1;
        NEXT_STATE STARTA;
        END
    ELSE
        BEGIN
        NEXT_STATE STARTA;
        END;
    END
    END
ELSE                            {DATA OR SOME OTHER CHIP'S CMD}
    BEGIN
    IF (COMMAND_BITX) THEN
        BEGIN
        IF (~COM_BUSY * ~VEC_FLUSH_FLAG) THEN
            BEGIN
            PIPE_LOCAL := 1;
            NEXT_STATE STARTA;
            END
        ELSE
            BEGIN
            FLUSH_FLAG := 1;
            CMD_FLUSH_FLAG := 1;    {TELL FLUSH ITS A CMD}
            NEXT_STATE STARTA;
            END;
```

```
                END
    ELSE                                    {PASS DATA THROUGH}
        BEGIN
        IF (VERTEX_FLAG) THEN VERTEX_FLAG;   {IF SET KEEP SET}
                            {ANY CMD WILL CLEAR VERTEX_FLAG}
        IF (~COM_BUSY * ~VEC_FLUSH_FLAG) THEN
            BEGIN
            TEMP_CMD_NDUMP;
            COM_SET;                {SET REGISTER IN YW STACK}
            DATA_LD;                {TELL PLA DATA WAS LOADED}
            IF (~VERTEX_FLAG) THEN PIPE_LOCAL := 1;
            NEXT_STATE STARTA;
            END
        ELSE
            BEGIN
            FLUSH_FLAG := 1;
            NEXT_STATE STARTA;     {LOOP}
            END;
        END;
    END;                            {END OF STATE DISPATCH}

{ ****************** PROCESS VERTEX COMMAND ******************}

SEND_VERT:
        BEGIN                        {THIS IS AN ODD STATE}

DO_NOT_START_SIDE;       {DO NOT LET SIDE DOOR MACHINE RUN}
    IF (COM_BUSY) THEN
        NEXT_STATE SEND_VERT_WAIT    {LOOP UNTIL IT CAN BE SENT}
    ELSE
        BEGIN
        TEMP_CMD_NDUMP;
        COM_SET;                {SET REGISTER IN YW STACK}
        COM_LD;                 {TELL PLA COMMAND WAS LOADED}
        VERTEX_FLAG := 1;       {NEXT DATA IS EATEN BY VERT CMD}
        NEXT_STATE STARTA;
        END;
    END;                        {END OF STATE SEND_VERT}

SEND_VERT_WAIT:              {WAIT FOR INTERPOLATOR}
        BEGIN                    {THIS IS AN EVEN STATE}
        DO_NOT_START_SIDE;       {DO NOT LET SIDE DOOR MACHINE RUN}
        IF (PRI_FLUSH_FLAG) THEN PRI_FLUSH_FLAG;
        IF (STOPX) THEN
            NEXT_STATE SEND_VERT_WAIT
        ELSE
            NEXT_STATE SEND_VERT; {GO BACK TO SEE IF I CAN DUMP CMD}
        END;

{ ****************** PROCESS SET_MODE COMMAND ******************}

SET_MODE:
        BEGIN                    {THIS IS AN ODD STATE}
        DO_NOT_START_SIDE;       {DO NOT LET SIDE DOOR MACHINE RUN}
        IF(KEEP_GOING_1) THEN KEEP_GOING_1;     {SECOND TIME THROUGH}
        CNT_RESET := 1;
        CNT_NORM := 1;           {RESET SET_MODE COUNTER}
        NEXT_STATE SET_MODE_2;
        END;

SET_MODE_2:                  {THIS IS AN EVEN STATE}
        BEGIN             {DELAY LONG ENOUGH FOR PIPE TO EMPTY}
        DO_NOT_START_SIDE;       {DO NOT LET SIDE DOOR MACHINE RUN}
        IF (PRI_FLUSH_FLAG) THEN PRI_FLUSH_FLAG;
        IF(KEEP_GOING_1) THEN KEEP_GOING_1;     {SECOND TIME THROUGH}
        IF (STOPX) THEN
            BEGIN
            CNT_NORM;            {STOP THE COUNTER}
```

```
                    NEXT_STATE SET_MODE_2;
                    END
                ELSE
                    NEXT_STATE SET_MODE_3;
                END;

SET_MODE_3:
            BEGIN                        {THIS IS AN ODD STATE}
            DO_NOT_START_SIDE;           {DO NOT LET SIDE DOOR MACHINE RUN}
            IF (KEEP_GOING_1) THEN KEEP_GOING_1;    {SECOND TIME THROUGH}
            IF (CNT[3]*CNT[2]*CNT[1]) THEN          {WAITED FOR PIPE TO FLUSH}
                BEGIN
                    IF (PRI_DONE*KEEP_GOING_1) THEN    {READY TO CHANGE MODE}
                        BEGIN
                        MODE_REG_LD;
                        NEXT_STATE STARTA;
                        END
                    ELSE                 {OUPUT STILL PROCESSING}
                        BEGIN
                        KEEP_GOING_1;    {LET COUNTER TIME OUT TWICE}
                        NEXT_STATE SET_MODE;  {TRY AGAIN}
                        END;
                    END
            ELSE                         {HAVE NOT COUNTED LONG ENOUGH}
                NEXT_STATE SET_MODE_2;   {COUNT UNTIL PIPE FLUSHED}
            END;

{ ****************** PROCESS READ_MODE COMMAND ******************}

READ_MODE:
            BEGIN                        {THIS IS AN ODD STATE}
            DO_NOT_START_SIDE;           {DO NOT LET SIDE DOOR MACHINE RUN}
            IF (COM_BUSY) THEN
                NEXT_STATE READ_MODE_WAIT    {LOOP UNTIL I CAN SEND IT}
            ELSE
                BEGIN
                TEMP_CMD_NDUMP;              {SEND COMMAND OUT AS HEADER}
                COM_SET;                 {SET COMMAND INTO YW STACK}
                COM_LD;                  {TELL INTERPOLATOR COMMAND LOADED}
                VECTOR_TRAP;
                PIPE_LOCAL := 1;         {TELL OUTPUT THAT SOMETHING IN PIPE}
                NEXT_STATE READ_MODE_2;
                END;
            END;

READ_MODE_WAIT:                  {WAIT FOR INTERPOLATOR}
            BEGIN                        {THIS IS AN EVEN STATE}
            DO_NOT_START_SIDE;           {DO NOT LET SIDE DOOR MACHINE RUN}
            IF (PRI_FLUSH_FLAG) THEN PRI_FLUSH_FLAG;
            IF (STOPX) THEN
                NEXT_STATE READ_MODE_WAIT
            ELSE
                NEXT_STATE READ_MODE;    {GO BACK TO SEE IF I CAN DUMP CMD}
            END;

READ_MODE_2:
            BEGIN                        {THIS IS AN EVEN STATE}
            DO_NOT_START_SIDE;           {DO NOT LET SIDE DOOR MACHINE RUN}
            IF (PRI_FLUSH_FLAG) THEN PRI_FLUSH_FLAG;
            IF (STOPX) THEN
                NEXT_STATE READ_MODE_2
            ELSE
                NEXT_STATE READ_MODE_3;  {GO TO DUMP DATA}
            END;

READ_MODE_3:
            BEGIN                        {THIS IS AN ODD STATE}
            DO_NOT_START_SIDE;           {DO NOT LET SIDE DOOR MACHINE RUN}
            IF (COM_BUSY) THEN
```

```
              NEXT_STATE READ_MODE_2    {LOOP UNTIL I CAN SEND IT}
            ELSE
              BEGIN
                MODE_REG_NDUMP;          {SEND CONTENTS OF MODE REG OUT}
                COM_SET;                 {TELL INTERPOLATOR REGISTER SET}
                DATA_LD;                 {TELL INTERPOLATOR DATA LOADED}
                PIPE_LOCAL := 1;         {TELL OUTPUT THAT SOMETHING IN PIPE}
                NEXT_STATE STARTA;       {GO BACK TO TOP OF LOOP}
                END;
            END;                         {END OF READ_MODE_2}

{ ****************** PROCESS DRAW_VEC COMMAND ******************}

DRAW_VEC_1:                    {WAIT FOR INTERPOLATOR}
            BEGIN                        {THIS IS AN ODD STATE}
              DO_NOT_START_SIDE;         {DO NOT LET SIDE DOOR MACHINE RUN}
              IF (FLUSH_FLAG) THEN FLUSH_FLAG;
              NEXT_STATE DRAW_VEC_2;     {GO BACK TO SEE IF I CAN DUMP CMD}
            END;

DRAW_VEC_2:
            BEGIN                        {THIS IS AN EVEN STATE}
              DO_NOT_START_SIDE;         {DO NOT LET SIDE DOOR MACHINE RUN}
              IF (PRI_FLUSH_FLAG) THEN PRI_FLUSH_FLAG;
              IF (FLUSH_FLAG) THEN FLUSH_FLAG;
              IF (STOPX) THEN
                NEXT_STATE DRAW_VEC_2
              ELSE
              BEGIN
                IF (COM_BUSY * FLUSH_FLAG) THEN
                  NEXT_STATE DRAW_VEC_1              {LOOP UNTIL I CAN SEND COMMAND}
                ELSE
                BEGIN
                  IF (FLUSH_FLAG) THEN     {NDUMP WAS NOT DONE IN DISPATCH}
                    BEGIN
                      TEMP_CMD_NDUMP;
                      COM_SET;                       {SET COMMAND INTO YW STACK}
                      COM_LD;                        {INTERPOLATOR COMMAND LOADED}
                    END;
                  D_YST_Y;                 {DUMP Y_START/MAJOR REG TO Y BUS}
                  CUR_Y_LD_Y_BUS;          {LOAD MY CURRENT Y/MAJOR REG}
                  D_XST_X;                 {DUMP X_START/MINOR FROM E.S.}
                  XS_LD_CMD_BUS;           {LOAD MINOR INTO X_START REG}
                  NEXT_STATE DRAW_VEC_3
                  END;
                END;
              END;                       {END OF STATE DRAW_VEC_2}

DRAW_VEC_3:
            BEGIN                        {THIS IS AN ODD STATE}
              DO_NOT_START_SIDE;         {DO NOT LET SIDE DOOR MACHINE RUN}
              ADVANCE_PAT_1;             {LATCH LINE PATTERN INTO ITS PIPE}
              IF (~YCNT_EQ_0) THEN
                BEGIN
                  FRAC_REG_LD;           {LOAD FRACTIONAL POSITION INTO REG}
                  ES_STEP;

SET_SWAP_MODE;                     {SEND STATUS TO INTERPOLATOR}
                  IF (MAJ_DECX) THEN
                    SWAP_MODE;                       {MAJ_DEC = SWAP ELSE NO-SWAP}
                  IF (LT_CNT_MINUS) THEN
                    S_LTP_SFT
                  ELSE
                    S_LT_DEC;            {STEP LINE TYPE WITH MAJOR AXIS}
                  NEXT_STATE DRAW_VEC_4;
                END
              ELSE
                BEGIN
                  PRI_FLUSH_FLAG;
                  NEXT_STATE STARTA;     {ZERO LENGTH VECTOR}
                END;
            END;                         {END OF STATE DRAW_VEC_3}
```

```
   DRAW_VEC_4:
      BEGIN                      {THIS IS AN EVEN STATE}
         DO_NOT_START_SIDE;      {DO NOT LET SIDE DOOR MACHINE RUN}
         IF (STOPX) THEN
            NEXT_STATE DRAW_VEC_4
         ELSE
            BEGIN
               D_XST_X;           {DUMP NEXT MINOR POSITION}
               XS_LD_CMD_BUS;     {LOAD MINOR INTO X_START REG}
               CUR_X_LD_XS;       {LOAD THE CURRENT X/MINOR REG}
               SET_SAVE_1 := 1;   {SAVE INCR_1,DECR_1, + HOLD_1}
               SET_SERP := 1;
               NEXT_STATE DRAW_VEC_5;
            END;
      END;                        {END OF STATE DRAW_VEC_4}

DRAW_VEC_5:
      BEGIN                       {THIS IS AN ODD STATE}
         VEC_PIXEL;               {TO SET LSB OF INT_MODEX}
         IF (YCNT_EQ_0) THEN DO_NOT_START_SIDE;
         IF (INCR_1) THEN CUR_X_LD_INCR;   {ADJUST MINOR IF NEEDED}
         IF (DECR_1) THEN CUR_X_LD_DECR;   {ADJUST MINOR IF NEEDED}
         CUR_MAJ_LD;
         FRAC_REG_LD;             {LOAD FRACTIONAL POSITION INTO REG}
         ADVANCE_PAT_3;           {ADVANCE LINE PATTERN PIPE}
         IF (Y_MAJOR) THEN
            ADD_LD_Y_Y
         ELSE
            ADD_LD_X_Y;
         IF(((INCR_1+DECR_1)*Y_MAJOR)+((INCR_1+DECR_1)*~C_IDX[2]*~Y_MAJOR))
         THEN
            BEGIN
               IF(~YCNT_EQ_0 * Y_MAJOR * C_IDX[2] ) THEN
                  BEGIN                    {LOOK FOR NEXT MAJOR STEP}
                     IF (MAJ_DECX) THEN CUR_Y_LD_DECR;   {ADJUST MAJOR AXIS}
                     IF (~MAJ_DECX) THEN CUR_Y_LD_INCR;  {ADJUST MAJOR AXIS}
                     ADVANCE_PAT_1;        {LATCH LINE PATTERN INTO ITS PIPE}
                     IF (LT_CNT_MINUS) THEN
                        S_LTP_SFT
                     ELSE
                        S_LT_DEC;          {STEP LINE TYPE WITH MAJOR AXIS;
                  ES_STEP;
               END;
               NEXT_STATE DRAW_VEC_STEP_1;
            END
         ELSE
            BEGIN
               IF (YCNT_EQ_0) THEN
                  NEXT_STATE DRAW_VEC_FLUSH_1  {RENDERING 1 MINOR AXIS STEP}
               ELSE
                  BEGIN
                     ES_STEP;
                     IF (MAJ_DECX) THEN CUR_Y_LD_DECR;   {ADJUST MAJOR AXIS}
                     IF (~MAJ_DECX) THEN CUR_Y_LD_INCR;  {ADJUST MAJOR AXIS}
                     ADVANCE_PAT_1;        {LATCH LINE PATTERN INTO ITS PIPE}
                     IF (LT_CNT_MINUS) THEN
                        S_LTP_SFT
                     ELSE
                        S_LT_DEC;          {STEP LINE TYPE WITH MAJOR AXIS}
                     NEXT_STATE DRAW_VEC_6;   {GOTO THE VECTOR LOOP}
                  END;
            END;
      END;                        {END OF STATE DRAW_VEC_5}

DRAW_VEC_6:                    {TOP OF LOOP FOR EACH MINOR AXIS STEP}
      BEGIN                       {THIS IS AN EVEN STATE}
         VEC_PIXEL;               {TO SET LSB OF INT_MODEX}
         IF (STOPX) THEN
            NEXT_STATE DRAW_VEC_6
         ELSE
```

```
    BEGIN
        INT_MODEX[2];                  {INTERPOLATOR MODE}
        D_XST_X;                            {DUMP NEXT MINOR POSITION}
        XS_LD_CMD_BUS;                      {PUT MINOR IN X_START REG}
        CUR_X_LD_XS;               {LOAD THE CURRENT X/MINOR REG}
        CUR_MAJ_NDUMP;             {SEND CURRENT MAJ TO INTERPOLATOR}
        IF (Y_MAJOR) THEN
            ADD_LD_X_X                          {LOAD ADDRESS REGISTER}
        ELSE
            ADD_LD_Y_X;                     {LOAD ADDRESS REGISTER}
        SET_SAVE := 1;                      {SAVE INCR, DECR, + HOLD}
        SET_SERP := 1;
        NEXT_STATE DRAW_VEC_7;
        END;
        END;                                {END OF STATE DRAW_VEC_6}

DRAW_VEC_7:
        BEGIN                      {THIS IS AN ODD STATE}
        VEC_PIXEL;                 {TO SET LSB OF INT_MODEX }
        IF (YCNT_EQ_0) THEN DO_NOT_START_SIDE;
        INT_MODEX[2];              {INTERPOLATOR MODE}
        IF (INCR) THEN CUR_X_LD_INCR;    {ADJUST MINOR IF NEEDED}
        IF (DECR) THEN CUR_X_LD_DECR;    {ADJUST MINOR IF NEEDED}
        CUR_MAJ_NDUMP;             {SEND CURRENT MAJ TO INTERPOLATOR}
        CUR_MAJ_LD;
        FRAC_REG_LD;               {LOAD FRACTIONAL POSITION INTO REG}

ADVANCE_PAT_3;              {LATCH LINE PATTERN INTO ITS PIPE}
ADD_VALID := OLD_INCR + OLD_DECR + OLD_HOLD;
VECTOR_TRAP := 1;           {TELL OUTPUT IS IS A VECTOR PIXEL}
AA_ROM_BANK[1] := ALMOST_AA_ADR;
AA_ROM_BANK[0] := ~AA_MD + OLD_HOLD;
ADD_NDUMP;                          {DUMP ADDRESS TO BUS}
EOS := ~OLD_INCR * ~OLD_DECR * ~OLD_HOLD; {NO VALID PIXEL}
IF (Y_MAJOR) THEN
    ADD_LD_Y_Y
 ELSE
    ADD_LD_X_Y;
IF (((INCR + DECR)*Y_MAJOR) + ((INCR + DECR)*~C_IDX[2]*~Y_MAJOR))
THEN                        {STEP ALONG MINOR AXIS}
    BEGIN
    IF(~YCNT_EQ_0 * Y_MAJOR * C_IDX[2] ) THEN
        BEGIN                   {LOOK FOR NEXT MAJOR STEP}
        IF (MAJ_DECX) THEN CUR_Y_LD_DECR;   {ADJUST MAJOR AXIS}
        IF (~MAJ_DECX) THEN CUR_Y_LD_INCR;  {ADJUST MAJOR AXIS}
        ADVANCE_PAT_1;     {LATCH LINE PATTERN INTO ITS PIPE}
        IF (LT_CNT_MINUS) THEN
            S_LTP_SFT
        ELSE
            S_LT_DEC;               {STEP LINE TYPE WITH MAJOR AXIS}
        ES_STEP;
        END;
    NEXT_STATE DRAW_VEC_STEP_1;
    END
ELSE
    BEGIN
    IF (~YCNT_EQ_0) THEN    {LOOK AT NEXT SCAN LINE}
        BEGIN
        ES_STEP;
        IF (MAJ_DECX) THEN CUR_Y_LD_DECR;   {ADJUST MAJOR AXIS}
        IF (~MAJ_DECX) THEN CUR_Y_LD_INCR;  {ADJUST MAJOR AXIS}
        ADVANCE_PAT_1;     {LATCH LINE PATTERN INTO ITS PIPE}
        IF (LT_CNT_MINUS) THEN
            S_LTP_SFT
        ELSE
            S_LT_DEC;               {STEP LINE TYPE WITH MAJOR AXIS}
        NEXT_STATE DRAW_VEC_6;
        END
    ELSE
        NEXT_STATE DRAW_VEC_FLUSH_1;        {CLEAN UP}
    END;
END;                                {END OF STATE DRAW_VEC_7}
```

```
DRAW_VEC_STEP_1:
    BEGIN                       {THIS IS AN EVEN STATE}
    VEC_PIXEL;                  {TO SET LSB OF INT_MODEX}
    IF (STOPX) THEN
        NEXT_STATE DRAW_VEC_STEP_1
    ELSE
    BEGIN
    INT_MODEX[2];               {INTERPOLATOR MODE}
    CUR_MAJ_NDUMP;              {SEND CURRENT MAJ TO INTERPOLATOR}
    IF (Y_MAJOR) THEN

ADD_LD_X_X              {LOAD ADDRESS REGISTER}
    ELSE
        ADD_LD_Y_X;             {LOAD ADDRESS REGISTER}
    NEXT_STATE DRAW_VEC_STEP_2;
    END;
    END;                        {END OF STATE DRAW_VEC_STEP_1}

DRAW_VEC_STEP_2:
    BEGIN                       {THIS IS AN ODD STATE}
    VEC_PIXEL;                  {TO SET LSB OF INT_MODEX }
    INT_MODEX[2];               {INTERPOLATOR MODE}
    IF (OLD_SERP) THEN CUR_X_LD_INCR; {ADJUST MINOR}
    IF (~OLD_SERP) THEN CUR_X_LD_DECR;   {ADJUST MINOR}
    CUR_MAJ_NDUMP;              {SEND CURRENT MAJ TO INTERPOLATOR}
    ADD_VALID := ALMOST_ADD_V;
    VECTOR_TRAP := 1;           {TELL OUTPUT IS IS A VECTOR PIXEL}
    AA_ROM_BANK[1] := OLD_INCR;
    ADD_NDUMP;                  {DUMP ADDRESS TO BUS}
    IF (~YCNT_EQ_0 * Y_MAJOR * C_IDX[2]) THEN
        BEGIN
        ES_STEP;
        IF (MAJ_DECX) THEN CUR_Y_LD_DECR;    {ADJUST MAJOR AXIS}
        IF (~MAJ_DECX) THEN CUR_Y_LD_INCR;   {ADJUST MAJOR AXIS}
        ADVANCE_PAT_1; {LATCH LINE PATTERN INTO ITS PIPE}
        IF (LT_CNT_MINUS) THEN
            S_LTP_SFT
        ELSE
            S_LT_DEC;           {STEP LINE TYPE WITH MAJOR AXIS}
        END;
    NEXT_STATE DRAW_VEC_STEP_3;
    END;

DRAW_VEC_STEP_3:
    BEGIN                       {THIS IS AN EVEN STATE}
    VEC_PIXEL;                  {TO SET LSB OF INT_MODEX}
    IF (STOPX) THEN
        NEXT_STATE DRAW_VEC_STEP_3
    ELSE
    BEGIN
    INT_MODEX[2];               {INTERPOLATOR MODE}
    CUR_MAJ_NDUMP;              {SEND CURRENT MAJ TO INTERPOLATOR}
    IF (Y_MAJOR) THEN
        ADD_LD_X_X              {LOAD ADDRESS REGISTER}
    ELSE
        ADD_LD_Y_X;             {LOAD ADDRESS REGISTER}
    NEXT_STATE DRAW_VEC_STEP_4;
    END;
    END;

DRAW_VEC_STEP_4:
    BEGIN                       {THIS IS AN ODD STATE}
    VEC_PIXEL;                  {TO SET LSB OF INT_MODEX }
    INT_MODEX[2];               {INTERPOLATOR MODE}
    IF (OLD_SERP) THEN CUR_X_LD_INCR; {ADJUST MINOR}
    IF (~OLD_SERP) THEN CUR_X_LD_DECR;   {ADJUST MINOR}
    CUR_MAJ_NDUMP;              {SEND CURRENT MAJ TO INTERPOLATOR}

ADD_VALID := Y_MAJOR + (~Y_MAJOR*~C_IDX[1]);
    EOS := ~Y_MAJOR * C_IDX[1]; {IF 2 PROC X MAJOR TELL OUTPUT}
    VECTOR_TRAP := 1;           {TELL OUTPUT IS IS A VECTOR PIXEL}
```

```
    AA_ROM_BANK[0] := 1;             {MIDDLE PIXEL}
    ADD_NDUMP;                       {DUMP ADDRESS TO BUS}
    IF(~YCNT_EQ_0) THEN
        BEGIN
        ES_STEP;
        IF (MAJ_DECX) THEN CUR_Y_LD_DECR;    {ADJUST MAJOR AXIS}
        IF (~MAJ_DECX) THEN CUR_Y_LD_INCR;   {ADJUST MAJOR AXIS}
        ADVANCE_PAT_1; {LATCH LINE PATTERN INTO ITS PIPE}
        IF (LT_CNT_MINUS) THEN
            S_LTP_SFT
        ELSE
            S_LT_DEC;                {STEP LINE TYPE WITH MAJOR AXIS}
        NEXT_STATE DRAW_VEC_6;
        END
    ELSE
        BEGIN
        DO_NOT_START_SIDE;           {END OF VECTOR SO TURN OFF SIDE}
        NEXT_STATE DRAW_VEC_FLUSH_1; {CLEAN UP}
        END;
    END;

DRAW_VEC_FLUSH_1:
    BEGIN                            {THIS IS AN EVEN STATE}
    DO_NOT_START_SIDE;               {END OF VECTOR SO TURN OFF SIDE}
    VEC_PIXEL;                       {TO SET LSB OF INT_MODEX}
    IF (STOPX) THEN
        NEXT_STATE DRAW_VEC_FLUSH_1
    ELSE
        BEGIN
        INT_MODEX[2];                {INTERPOLATOR MODE}
        CUR_MAJ_NDUMP;               {SEND CURRENT MAJ TO INTERPOLATOR}
        IF (Y_MAJOR) THEN
            ADD_LD_X_X               {LOAD ADDRESS REGISTER}
        ELSE
            ADD_LD_Y_X;              {LOAD ADDRESS REGISTER}
        IF (COMMAND_FULLX*~SIDE_DOOR_BUSY) THEN
            BEGIN                    {DO SAME AS STATE STARTA}
            D_CMD_X;                 {DUMP E.S. CMD REG TO CMD BUS}
            TEMP_CMD_LD;             {LOAD TEMP CMD REG}
            COMMAND_TAKEN;           {TELL EDGE STEPPER COMMAND TAKEN}
            VEC_FLUSH_FLAG := 1;     {FLAG TO FINISH VECTOR}
            NEXT_STATE DISPATCH;     {SEE IF IT'S FOR ME}
            END
        ELSE
            BEGIN  {COMMAND NOT READY, GOTO FLUSH TO SYNC TO CLK25MHZX}
            NEXT_STATE DRAW_VEC_FLUSH_2;
            END;
        END;
    END;

DRAW_VEC_FLUSH_2:
    BEGIN                            {THIS IS AN ODD STATE}
    VEC_PIXEL;                       {TO SET LSB OF INT_MODEX}

DO_NOT_START_SIDE;               {END OF VECTOR SO TURN OFF SIDE}
    INT_MODEX[2];                    {INTERPOLATOR MODE}
    PRI_FLUSH_FLAG;
    ADD_VALID := ALMOST_ADD_V;
    VECTOR_TRAP := 1;                {TELL OUTPUT IS IS A VECTOR PIXEL}
    AA_ROM_BANK[1] := ALMOST_AA_ADR;
    AA_ROM_BANK[0] := ~AA_MD + OLD_HOLD;
    ADD_NDUMP;                       {DUMP ADDRESS TO BUS}
    CUR_MAJ_NDUMP;                   {SEND CURRENT MAJ TO INTERPOLATOR}
    EOS := 1;                        {FORCE END OF PRIMATIVE}
    PIPE_LOCAL := 1;                 {EOS * PIPE = EOP}
    NEXT_STATE STARTA;
    END;
```

{ ***************** PROCESS DRAW_TRAP COMMAND *****************}

```
            DRAW_TRAP:
                BEGIN                    {THIS IS AN ODD STATE}
                DO_NOT_START_SIDE;       {DO NOT LET SIDE DOOR MACHINE RUN}
                IF(COM_BUSY)THEN
                NEXT_STATE DRAW_TRAP_WAIT {LOOP UNTIL I CAN SEND COMMAND}
                ELSE
                  BEGIN
                  TEMP_CMD_NDUMP;
                  COM_SET;               {SET COMMAND INTO YW STACK}
                  COM_LD;         {TELL INTERPOLATOR COMMAND LOADED}
                  NEXT_STATE DRAW_TRAP_2;
                  END;
                END;

DRAW_TRAP_WAIT:              {WAIT FOR INTERPOLATOR}
                BEGIN                    {THIS IS AN EVEN STATE}
                DO_NOT_START_SIDE;       {DO NOT LET SIDE DOOR MACHINE RUN}
                IF (PRI_FLUSH_FLAG) THEN PRI_FLUSH_FLAG;
                IF(W_FLAG*W_FRAC_FLAG_A) THEN S_WF_ADD;   {START W INTERPOLATION}
                IF(W_FLAG*W_FRAC_FLAG_B) THEN S_WFRT_ADD; {START W INTERPOLATION}
                IF (STOPX) THEN
                    NEXT_STATE DRAW_TRAP_WAIT
                ELSE
                    NEXT_STATE DRAW_TRAP;   {GO BACK TO SEE IF I CAN DUMP CMD}
                END;

DRAW_TRAP_2:
                BEGIN                    {THIS IS AN EVEN STATE}
                IF (PRI_FLUSH_FLAG) THEN PRI_FLUSH_FLAG;
                IF(W_FLAG*W_FRAC_FLAG_A) THEN S_WF_ADD;   {START W INTERPOLATION}
                IF(W_FLAG*W_FRAC_FLAG_B) THEN S_WFRT_ADD; {START W INTERPOLATION}
                IF (STOPX) THEN
                    NEXT_STATE DRAW_TRAP_2
                ELSE
                BEGIN
                CNT_RESET;       {GET COUNTER READY}
                CNT_NORM;        {COUNT = 0 WHEN ENTERING TRAP_SET_UP_EVEN}
                NEXT_STATE DRAW_TRAP_3;
                END;
                END;

DRAW_TRAP_2X:
                BEGIN                    {THIS IS AN EVEN STATE}
                IF (STOPX) THEN
                    NEXT_STATE DRAW_TRAP_2X
                ELSE
                BEGIN
                CNT_RESET;       {GET COUNTER READY}
                CNT_NORM;        {COUNT = 0 WHEN ENTERING TRAP_SET_UP_EVEN}
                IF(W_FLAG) THEN S_WF_ADD;         {START W INTERPOLATION}
                IF(W_FLAG) THEN S_WFRT_ADD;       {START W INTERPOLATION}
                NEXT_STATE DRAW_TRAP_3;
                END;
                END;

DRAW_TRAP_3:
                BEGIN                    {THIS IS AN ODD STATE}
                IF (YCNT_EQ_0) THEN      {CHECK IF DONE}
                    BEGIN
                    DO_NOT_START_SIDE;
                    PRI_FLUSH_FLAG;
                    EOS;                 {TELL OUTPUT EOP}
                    PIPE_LOCAL;          {EOS + PIPE_LOCAL = EOP}
                    NEXT_STATE STARTA;   {NO NEXT SCAN LINE TO RENDER}
                    END
                ELSE
                    BEGIN
                    CUR_MAJ_LD;
```

```
        IF ((~MAJ_AXIS[1]*~MAJ_AXIS[0]*S0) +
            (~MAJ_AXIS[1]*MAJ_AXIS[0]*S1) +
            (MAJ_AXIS[1]*~MAJ_AXIS[0]*S2) +
            (MAJ_AXIS[1]*MAJ_AXIS[0]*S3)) THEN      {IF (MY_LINE) }
            BEGIN
            NEXT_STATE TRAP_SET_UP_EVEN;
            END
        ELSE
            BEGIN
            ES_STEP;                    {STEP E.S. TO NEXT SCAN}
            CUR_Y_LD_INCR;              {ADJUST CURRENT Y}
            NEXT_STATE DRAW_TRAP_2X;
            END;
        END;
    END;

{*************** RENDERING LOOP FOR TRAPEZOID'S ******************}

TRAP_SET_UP_EVEN:               {SET UP SCAN LINE}
        BEGIN                       {THIS IS AN EVEN STATE}
        IF (FOUND_LINE*~NEW_SCAN_LINE) THEN FOUND_LINE;
        IF (KEEP_GOING_1) THEN KEEP_GOING_1;
        IF (KEEP_GOING_2) THEN KEEP_GOING_2;
        IF (KEEP_GOING_3) THEN KEEP_GOING_3;
        IF (STOPX) THEN
            BEGIN
            IF (W_FRAC_FLAG_A) THEN W_FRAC_FLAG_A;   {FLAG FROM ODD}
            CNT_NORM;                   {STOP THE COUNTER WHILE STOPPED}

NEXT_STATE TRAP_SET_UP_EVEN;
            END
        ELSE
            BEGIN
            CUR_MAJ_NDUMP;              {SEND CURRENT Y TO INTERPOLATOR}
            IF(W_FLAG*W_FRAC_FLAG_A) THEN S_WF_ADD;    {FLAG SET IN ODD}
            IF(W_FLAG*W_FRAC_FLAG_A) THEN S_WFRT_ADD;
            IF (~CNT[3]*~CNT[2]*~CNT[1]) THEN                {COUNT = 000x}
                BEGIN
                SET_XS_FRAC;                {SAVE NO XS_FRAC FOR THIS SCAN}
                ADD_LD_Y_Y;                 {MOVE CURRENT Y TO ADDRESS}
                IF (TM_MODEX) THEN
                    BEGIN
                    W_ROM_NDUMP;        {W_ROM EQUALS 1}
                    W_NDUMP;            {ENABLE 1 ONTO BUS}
                    INT_MODEX[3:0] := MODE_L1;
                    END
                ELSE
                    BEGIN
                    IF (SEC_COLORX) THEN
                        INT_MODEX[3:0] := MODE_L2
                    ELSE
                        INT_MODEX[3:0] := MODE_L3;
                    END;
                END;
            IF (~CNT[3]*~CNT[2]*CNT[1]) THEN                 {COUNT = 001x}
                BEGIN
                IF(NO_XS_FRAC) THEN         {IF NO FRAC THEN DO NOT ADJ}
                    CUR_X_LD_XS
                ELSE
                    CUR_X_LD_XS_INCR;
                IF (~SEC_COLORX*~TM_MODEX) THEN
                    BEGIN
                    XS_NDUMP;
                    XS_SET;
                    CNT_RESET;          {GET READY TO GO TO RENDER LOOP}
                    CNT_NORM;
                    INT_MODEX[3:0] := MODE_R3;
                    END;
                IF (~SEC_COLORX*TM_MODEX) THEN
                    INT_MODEX[3:0] := MODE_L3;
```

```
            IF (SEC_COLORX*~TM_MODEX) THEN
                INT_MODEX[3:0] := MODE_L3;
            IF (SEC_COLORX*TM_MODEX) THEN
                INT_MODEX[3:0] := MODE_L2;
            END;
        IF (~CNT[3]*CNT[2]*~CNT[1]) THEN                {COUNT = 010x}
        BEGIN
            IF (~SEC_COLORX*TM_MODEX) THEN
            BEGIN
                W_ROM_NDUMP;      {W_ROM EQUALS 1}
                W_NDUMP;          {ENABLE 1 ONTO BUS}
                INT_MODEX[3:0] := MODE_R1;
            END;
            IF (SEC_COLORX*~TM_MODEX) THEN
                INT_MODEX[3:0] := MODE_R2;

IF (SEC_COLORX*TM_MODEX) THEN
                INT_MODEX[3:0] := MODE_L3;
        END;
        IF (~CNT[3]*CNT[2]*CNT[1]) THEN                 {COUNT = 011x}
        BEGIN
            IF (~SEC_COLORX*TM_MODEX) THEN
            BEGIN
                XS_NDUMP;
                XS_SET;
                CNT_RESET;        {GET READY TO GO TO RENDER LOOP}
                CNT_NORM;
                INT_MODEX[3:0] := MODE_R3;
            END;
            IF (SEC_COLORX*~TM_MODEX) THEN
            BEGIN
                XS_NDUMP;
                XS_SET;
                CNT_RESET;        {GET READY TO GO TO RENDER LOOP}
                CNT_NORM;
                INT_MODEX[3:0] := MODE_R3;
            END;
            IF (SEC_COLORX*TM_MODEX) THEN
            BEGIN
                W_ROM_NDUMP;      {W_ROM EQUALS 1}
                W_NDUMP;          {ENABLE 1 ONTO BUS}
                INT_MODEX[3:0] := MODE_R1;
            END;
        END;
        IF (CNT[3]*~CNT[2]*~CNT[1]) THEN                {COUNT = 100x}
        BEGIN
            IF (SEC_COLORX*TM_MODEX) THEN
                INT_MODEX[3:0] := MODE_R2;
        END;
        IF (CNT[3]*~CNT[2]*CNT[1]) THEN                 {COUNT = 101x}
        BEGIN
            IF (SEC_COLORX*TM_MODEX) THEN
            BEGIN
                XS_NDUMP;
                XS_SET;
                CNT_RESET;           {GET READY TO GO TO RENDER LOOP}
                CNT_NORM;
                INT_MODEX[3:0] := MODE_R3;
            END;
        END;
        NEXT_STATE TRAP_SET_UP_ODD;
    END;
    END;

TRAP_SET_UP_ODD:
    BEGIN                               {THIS IS AN ODD STATE}
    IF (INT_MODEX[3]) THEN INT_MODEX[3];    {SET SAME MODES AS EVEN}
    IF (INT_MODEX[2]) THEN INT_MODEX[2];    {SET SAME MODES AS EVEN}
    IF (INT_MODEX[1]) THEN INT_MODEX[1];    {SET SAME MODES AS EVEN}
    IF (INT_MODEX[0]) THEN INT_MODEX[0];    {SET SAME MODES AS EVEN}
    IF (FOUND_LINE) THEN FOUND_LINE;
    IF (~YCNT_EQ_0 * ~FOUND_LINE) THEN      {FIND NEXT SCAN}
```

```
    BEGIN
        CUR_Y_LD_INCR;          {ADJUST CURRENT Y}
        W_FRAC_FLAG_A;          {SET TO ADJUST FRAC}
        W_FRAC_FLAG_B;          {SET IN CASE OF GOTO TRAP_2}
        ES_STEP;                {E.S. POINTS TO SCAN LINE N + 1}
        KEEP_GOING_1;    {USED TO TELL MUTLI PROC PASSED HERE ONCE}
        IF(~C_IDX[2] * ~C_IDX[1]) THEN FOUND_LINE; {I.E. SINGLE PROC}
        IF (~C_IDX[2] * KEEP_GOING_1) THEN FOUND_LINE; {2 PROC}
        IF (C_IDX[2] * KEEP_GOING_1) THEN KEEP_GOING_2;
        IF (C_IDX[2] * KEEP_GOING_2) THEN KEEP_GOING_3;
        IF (C_IDX[2] * KEEP_GOING_3) THEN FOUND_LINE;  {4 proc}
    END;
    CUR_MAJ_NDUMP;              {SEND CURRENT Y TO INTERPOLATOR}
    IF (~CNT[3]*~CNT[2]*~CNT[1]) THEN            {COUNT = 000x}
        BEGIN
            SET_SWAP_MODE;      {SET OR CLEARED BASED ON HOURGLASS}
            IF (TM_MODEX) THEN
                BEGIN
                    W_ROM_NDUMP;        {W_ROM EQUALS 1}
                    W_NDUMP;            {ENABLE 1 ONTO BUS}
                END;
            IF (~HOURGLASS*W_FLAG) THEN
                BEGIN
                    W_REGS_LD_1;                {LOAD THE W REGISTERS}
                END;
            IF (HOURGLASS*W_FLAG) THEN
                BEGIN
                    W_REGS_LD_2;                {LOAD THE W REGISTERS}
                END;
            IF (~HOURGLASS) THEN
                BEGIN
                    D_XST_X;            {E.S. DUMP XS TO CMD BUS}
                    D_XRT_Y;            {E.S. DUMP XE TO Y BUS}
                    XS_LD_CMD_BUS;              {LOAD XS FROM COMMAND BUS}
                    XE_LD_Y_BUS;                {LOAD XE FROM THE Y BUS}
                END
            ELSE
                BEGIN
                    SWAP_MODE;          {TELL INTERPOLATOR WE SWAPPED}
                    D_XST_X;            {E.S. DUMP XE TO CMD BUS}
                    D_XRT_Y;            {E.S. DUMP XS TO Y BUS}
                    XS_LD_Y_BUS;        {HOURGLASS SO LOAD XS FROM Y BUS}
                    XE_LD_CMD_BUS;              {LOAD XE FROM THE CMD BUS}
                END;
            IF (~YCNT_EQ_0) THEN
                NEXT_STATE TRAP_SET_UP_EVEN
            ELSE
                BEGIN
                    EOS;                        {TELL OUTPUT EOP}
                    PIPE_LOCAL;                 {EOS + PIPE_LOCAL = EOP}
                    NEXT_STATE STARTA;  {CHECK LAST YCNT FROM RENDER LOOP}
                END;
        END;
    IF (~CNT[3]*~CNT[2]*CNT[1]) THEN             {COUNT = 001x}
        BEGIN
            IF (~SEC_COLORX*~TM_MODEX) THEN BEGIN
                    XE_NDUMP;
                    XE_SET;
                    IF (NO_X_SCAN * ~NO_XS_FRAC)THEN {DON'T DO CURRENT SCAN}
                        NEXT_STATE DRAW_TRAP_2
                    ELSE
                        NEXT_STATE TRAP_RENDER_EVEN;
                END
            ELSE
                NEXT_STATE TRAP_SET_UP_EVEN;
        END;
    IF (~CNT[3]*CNT[2]*~CNT[1]) THEN             {COUNT = 010x}
        BEGIN
```

```
            IF (~SEC_COLORX*TM_MODEX) THEN
                BEGIN
                W_ROM_NDUMP;       {W_ROM EQUALS 1}
                W_NDUMP;           {ENABLE 1 ONTO BUS}
                END;
            NEXT_STATE TRAP_SET_UP_EVEN;
            END;
        IF (~CNT[3]*CNT[2]*CNT[1]) THEN                      {COUNT = 011x}
            BEGIN
            IF (~SEC_COLORX*TM_MODEX + SEC_COLORX*~TM_MODEX) THEN
                BEGIN
                XE_NDUMP;
                XE_SET;
                IF (NO_X_SCAN * ~NO_XS_FRAC)THEN  {DON'T DO CURRENT SCAN}
                    NEXT_STATE DRAW_TRAP_2
                ELSE
                    NEXT_STATE TRAP_RENDER_EVEN;
                END;
            IF (SEC_COLORX*TM_MODEX) THEN
                BEGIN
                W_ROM_NDUMP;       {W_ROM EQUALS 1}
                W_NDUMP;           {ENABLE 1 ONTO BUS}
                NEXT_STATE TRAP_SET_UP_EVEN;
                END;
            END;
        IF (CNT[3]*~CNT[2]*~CNT[1]) THEN                     {COUNT = 100x}
            BEGIN
            NEXT_STATE TRAP_SET_UP_EVEN;
            END;
        IF (CNT[3]*~CNT[2]*CNT[1]) THEN                      {COUNT = 101x}
            BEGIN
            XE_NDUMP;
            XE_SET;
            IF (NO_X_SCAN * ~NO_XS_FRAC)THEN     {DON'T DO CURRENT SCAN}
                NEXT_STATE DRAW_TRAP_2
            ELSE
                NEXT_STATE TRAP_RENDER_EVEN;
            END;
        END;

TRAP_RENDER_EVEN:            {RENDER PIXEL LOOP}
    BEGIN                    {THIS IS AN EVEN STATE}

IF (FOUND_LINE) THEN FOUND_LINE;
    IF (KEEP_GOING_1) THEN KEEP_GOING_1;
    IF (KEEP_GOING_2) THEN KEEP_GOING_2;
    IF (KEEP_GOING_3) THEN KEEP_GOING_3;
    IF (W_FRAC_FLAG_A) THEN W_FRAC_FLAG_A;    {FLAG FROM ODD}
    IF (STOPX) THEN
        BEGIN
        CNT_NORM;                {STOP THE COUNTER WHILE STOPPED}
        NEXT_STATE TRAP_RENDER_EVEN;
        END
    ELSE
        BEGIN
        CUR_X_NDUMP;
        IF(W_FLAG*W_FRAC_FLAG_A) THEN S_WF_ADD;   {FLAG SET IN ODD}
        IF(W_FLAG*W_FRAC_FLAG_A) THEN S_WFRT_ADD;
        IF (~CNT[3]*~CNT[2]*~CNT[1]) THEN                    {COUNT = 000x}
            BEGIN
            ADD_LD_X_X;
            IF (TM_MODEX) THEN
                BEGIN
                INT_MODEX[3:0] := MODE_P1;
                W_ROM_NDUMP;       {W_ROM EQUALS 1}
                W_NDUMP;           {ENABLE 1 ONTO BUS}
                END
            ELSE
                BEGIN
                IF (W_FLAG) THEN
                    BEGIN
```

```
                    WE_NDUMP;
                    W_NDUMP;
                    END
                ELSE
                    BEGIN
                    W_ROM_NDUMP;
                    W_NDUMP;
                    END;
                IF(SEC_COLORX) THEN
                    INT_MODEX[3:0] := MODE_P2      {TM = 0 SEC = 1}
                ELSE
                    BEGIN                          {TM = 0 SEC = 0}
                    CNT_RESET;                {GET READY FOR NEXT PIXEL}
                    CNT_NORM;
                    INT_MODEX[3:0] := MODE_P3
                    END;
                END;
            END;
        IF (~CNT[3]*~CNT[2]*CNT[1]) THEN              {COUNT = 001x}
            BEGIN
            IF (W_FLAG) THEN
                BEGIN
                WE_NDUMP;
                W_NDUMP;
                END
            ELSE
                BEGIN
                W_ROM_NDUMP;

W_NDUMP;
                END;
            IF (SEC_COLORX*TM_MODEX) THEN
                INT_MODEX[3:0] := MODE_P2
             ELSE
                BEGIN
                CNT_RESET;                {GET READY FOR NEXT PIXEL}
                CNT_NORM;
                INT_MODEX[3:0] := MODE_P3;
                END;
            END;
        IF (~CNT[3]*CNT[2]) THEN                      {COUNT = 01xx}
            BEGIN
            IF (W_FLAG) THEN
                BEGIN
                WE_NDUMP;
                W_NDUMP;
                END
            ELSE
                BEGIN
                W_ROM_NDUMP;
                W_NDUMP;
                END;
            CNT_RESET;            {GET READY FOR NEXT PIXEL}
            CNT_NORM;
            INT_MODEX[3:0] := MODE_P3;
            END;
        NEXT_STATE TRAP_RENDER_ODD;
        END;
    END;

TRAP_RENDER_ODD:
    BEGIN                      {THIS IS AN ODD STATE}
    IF (INT_MODEX[3]) THEN INT_MODEX[3];    {SET SAME MODES AS EVEN}
    IF (INT_MODEX[2]) THEN INT_MODEX[2];    {SET SAME MODES AS EVEN}
    IF (INT_MODEX[1]) THEN INT_MODEX[1];    {SET SAME MODES AS EVEN}
    IF (INT_MODEX[0]) THEN INT_MODEX[0];    {SET SAME MODES AS EVEN}
    IF (FOUND_LINE) THEN FOUND_LINE;
    CUR_X_NDUMP;
    ADD_NDUMP;
    IF (~YCNT_EQ_0 * ~FOUND_LINE) THEN         {FIND NEXT SCAN}
        BEGIN                       {NOTE SET UP DOES FIRST FEW PASSES}
```

```
        CUR_Y_LD_INCR;           {ADJUST CURRENT Y}
        W_FRAC_FLAG_A;           {SET TO ADJUST FRAC}
        W_FRAC_FLAG_B;           {SET IN CASE OF GOTO TRAP_2}
        ES_STEP;                 {E.S. POINTS TO SCAN LINE N + 1}
        IF (C_IDX[2] * KEEP_GOING_2) THEN KEEP_GOING_3;
        IF (C_IDX[2] * KEEP_GOING_3) THEN FOUND_LINE;  {4 proc}
        END;
IF (~CNT[3]*~CNT[2]*~CNT[1]) THEN            {COUNT = 000x}
   BEGIN
   ADD_VALID;
   IF (X_END) THEN
      BEGIN
      EOS;                                   {END OF SCAN}
      IF (YCNT_EQ_0) THEN BEGIN
            PIPE_LOCAL;       {TELL OUTPUT EOP (EOS*PIPE=EOP)}
            END;
        END;
   END;
   IF (INT_MODEX[2]) THEN        {MODE_P1}
      BEGIN
      W_ROM_NDUMP;   {W_ROM EQUALS 1}
      W_NDUMP;                   {ENABLE 1 ONTO BUS}
      NEXT_STATE TRAP_RENDER_EVEN;
      END;
   IF (~INT_MODEX[2]*~INT_MODEX[0]) THEN     {MODE_P2}
      BEGIN
      IF (W_FLAG) THEN
            BEGIN
            WS_NDUMP;
            W_NDUMP;
            END
         ELSE
            BEGIN
            W_ROM_NDUMP;
            W_NDUMP;
            END;
      NEXT_STATE TRAP_RENDER_EVEN;
      END;
    IF (INT_MODEX[0]) THEN                   {MODE_P3}
       BEGIN
       CUR_X_LD_INCR;
       IF (W_FLAG) THEN
            BEGIN
            WS_NDUMP;
            W_NDUMP;
            END
         ELSE
            BEGIN
            W_ROM_NDUMP;
            W_NDUMP;
            END;
       IF (X_END) THEN
            BEGIN
            IF (YCNT_EQ_0) THEN
                BEGIN
                DO_NOT_START_SIDE;
                PRI_FLUSH_FLAG;
                NEXT_STATE STARTA;
                END
              ELSE
                BEGIN
                IF (FOUND_LINE) THEN
                    BEGIN
                    CUR_MAJ_LD;
                    NEW_SCAN_LINE;
                    NEXT_STATE TRAP_SET_UP_EVEN;
                    END
                  ELSE          {LOOK FOR NEXT SCAN LINE}
                    NEXT_STATE DRAW_TRAP_2;
```

```
                    END;
                END
            ELSE
                NEXT_STATE TRAP_RENDER_EVEN;
            END;
        END;

OTHERWISE
    BEGIN
        ?X_STEPPER[0];
        ?X_STEPPER[1];
        ?X_STEPPER[2];
        ?X_STEPPER[3];
        ?X_STEPPER[4];
        ?X_STEPPER[5];
        ?X_STEPPER[6];
        ?X_STEPPER[7];
        ?X_STEPPER[8];
        ?X_STEPPER[9];
        ?X_STEPPER[10];
        ?X_STEPPER[11];
        ?X_STEPPER[12];
        ?X_STEPPER[13];
        ?X_STEPPER[14];
        ?X_STEPPER[15];
        ?X_STEPPER[16];
        ?X_STEPPER[17];
        ?X_STEPPER[18];
        ?X_STEPPER[19];
        ?X_STEPPER[20];
        ?X_STEPPER[21];
        ?X_STEPPER[22];
        ?X_STEPPER[23];
    ?FLUSH_FLAG;
    ?VERTEX_FLAG;
    ?CMD_FLUSH_FLAG;
    ?SCAN_FLUSH_FLAG;
    ?VEC_FLUSH_FLAG;
    ?PRI_FLUSH_FLAG;
    ?FOUND_LINE;
    ?KEEP_GOING_1;
    ?KEEP_GOING_2;
    ?KEEP_GOING_3;
    ?NEW_SCAN_LINE;
    ?W_FRAC_FLAG_A;
    ?W_FRAC_FLAG_B;
    ?SET_SERP;
    ?SET_SAVE;
    ?SET_SAVE_1;
    ?SET_SLOPE;
    ?VEC_PIXEL;
    ?CNT_RESET;
    ?CNT_NORM;
    ?ADD_VALID;
    ?EOS;

?VECTOR_TRAP;
    ?PIPE_LOCAL;
    ?ADVANCE_PAT_1;
    ?ADVANCE_PAT_3;
    ?CUR_Y_LD_Y_BUS;
    ?CUR_Y_LD_INCR;
    ?CUR_Y_LD_DECR;
    ?CUR_MAJ_LD;
    ?CUR_MAJ_NDUMP;
    ?XS_LD_CMD_BUS;
    ?XS_LD_Y_BUS;
    ?XS_NDUMP;
    ?CUR_X_LD_XS;
    ?CUR_X_LD_XS_INCR;
```

```
                ?CUR_X_NDUMP;
                ?CUR_X_LD_INCR;
                ?CUR_X_LD_DECR;
                ?ADD_LD_X_X;
                ?ADD_LD_X_Y;
                ?ADD_LD_Y_X;
                ?ADD_LD_Y_Y;
                ?ADD_NDUMP;
                ?XE_LD_Y_BUS;
                ?XE_LD_CMD_BUS;
                ?XE_NDUMP;
                ?W_REGS_LD_1;
                ?W_REGS_LD_2;
                ?WS_NDUMP;
                ?WE_NDUMP;
                ?W_NDUMP;
                ?W_ROM_NDUMP;
                ?CUR_CMD_LD;
                ?TEMP_CMD_LD;
                ?TEMP_CMD_NDUMP;
                ?MODE_REG_LD;
                ?MODE_REG_NDUMP;
                ?FRAC_REG_LD;
                ?AA_ROM_BANK[1];
                ?AA_ROM_BANK[0];
                ?IN_BUFFER_TAKEN;
                ?SFT_ES_A_IN;
                ?SFT_ES_B_IN;
                ?SFT_ES_COUNT_IN;
                ?D_CMD_X;
                ?D_XST_X;
                ?D_YSL_X;
                ?D_XRT_Y;
                ?D_YST_Y;
                ?S_LT_DEC;
                ?S_LTP_SFT;
                ?RESET_LINETYPE;
                ?S_WF_ADD;
                ?S_WFRT_ADD;
                ?ES_STEP;
                ?INT_MODEX[3];
                ?INT_MODEX[2];
                ?INT_MODEX[1];
                ?XS_SET;
                ?XE_SET;
                ?COM_SET;
                ?COM_LD;
                ?DATA_LD;
                  END;

END;                          {END OF CASE}
     END;                              {END OF MACHINE X-STEPPER}

{*******************************************************************
****                                                             ****
****                  MACHINE SIDE_DOOOR                         ****
****                                                             ****
*******************************************************************}

MACHINE SIDE_DOOR;
     BEGIN
        IF RESETX_2 THEN
           BEGIN
             ?SIDE_FLUSH_FLAG;
             ?SIDE_DOOR_CMD;
             NEXT_STATE CHECK_X_STEPPER;
           END
        ELSE
           CASE PRESENT STATE OF
```

```
CHECK_X_STEPPER:
    BEGIN
        IF (DO_NOT_START_SIDE + CLK25MHZX) THEN     {X_STEPPER IN CONTROL}
            NEXT_STATE CHECK_X_STEPPER
        ELSE
            IF (COMMAND_FULLX) THEN                 {E.S. HAS A COMMAND}
                NEXT_STATE SIDE_DOOR_2
            ELSE
                NEXT_STATE CHECK_X_STEPPER;
    END;                            {END OF STATE CHECK_X_STEPPER}

SIDE_DOOR_2:
    BEGIN
        IF (DO_NOT_START_SIDE) THEN                 {X_STEPPER IN CONTROL}
            NEXT_STATE CHECK_X_STEPPER        {CHECK AGAIN, DO TO DELAY}
        ELSE
            IF (COMMAND_FULLX) THEN                 {E.S. HAS A COMMAND}
                BEGIN
                    SIDE_DOOR_BUSY;
                    IF (SCAN_DECODEX *
                        (~CMDS[7]*~CMDS[6]*CMDS[5]*~CMDS[4]*CMDS[3])) THEN
                        NEXT_STATE SIDE_DOOR_3   {PROCESS VERTEX COMMAND}
                    ELSE
                        NEXT_STATE CHECK_X_STEPPER      {ONLY PASS VERTEX}
                END;
    END;                            {END OF STATE SIDE_DOOR_2}

SIDE_DOOR_3:

BEGIN
    SIDE_DOOR_BUSY;
    IF (~CLK25MHZX) THEN        {SYNC TO CLOCK}
        BEGIN
            IF(VEC_PIXEL) THEN      {DUMP THIS STATE (X_S RENDERING VEC)}
                BEGIN
                    D_CMD_X;
                    TEMP_CMD_LD;
                    COMMAND_TAKEN;              {TELL E.S. THAT COMMAND TAKEN}
                END;
            NEXT_STATE SIDE_DOOR_4;
        END
    ELSE
        NEXT_STATE SIDE_DOOR_3;
END;                            {END OF STATE SIDE_DOOR_3}

SIDE_DOOR_4:
    BEGIN
        SIDE_DOOR_BUSY;
        SIDE_DOOR_CMD;          {TELL INTERPOLATOR CMD IS SENT}
        SIDE_FLUSH_FLAG;        {SEND WORD TO INTERPOLATOR}
        IF(~VEC_PIXEL) THEN     {DUMP THIS STATE (X_S RENDERING TRAP)}
            BEGIN
                D_CMD_X;
                TEMP_CMD_LD;
                COMMAND_TAKEN;          {TELL E.S. THAT COMMAND TAKEN}
            END;
        NEXT_STATE SIDE_DOOR_5;
    END;                        {END OF STATE SIDE_DOOR_4}

SIDE_DOOR_5:            {STATES 5 AND 6 PASS VERTEX DATA}
    BEGIN
        SIDE_DOOR_BUSY;
        IF (SIDE_FLUSH_FLAG) THEN SIDE_FLUSH_FLAG;
        IF (SIDE_DOOR_CMD) THEN SIDE_DOOR_CMD;
        IF (COMMAND_FULLX * ~SIDE_FLUSH_FLAG * VEC_PIXEL) THEN
                                        {INPUT FULL & I'M NOT}

BEGIN
                IF (COMMAND_BITX) THEN          {GONE ON TO NEXT COMMAND}
                    NEXT_STATE CHECK_X_STEPPER
                ELSE
                    BEGIN
```

```
                D_CMD_X;
                TEMP_CMD_LD;
                COMMAND_TAKEN;           {TELL E.S. THAT COMMAND TAKEN}
                SIDE_FLUSH_FLAG;         {FLUSH DATA NEXT STATE}
                NEXT_STATE SIDE_DOOR_6;
                END;
            END
        ELSE
            NEXT_STATE SIDE_DOOR_6;
        END;                        {END OF STATE SIDE_DOOR_5}

SIDE_DOOR_6:
    BEGIN
    SIDE_DOOR_BUSY;

IF (SIDE_FLUSH_FLAG) THEN
        BEGIN
        IF (~COM_BUSY) THEN      {SEND THE WORD TO YW STACK}
            BEGIN
            TEMP_CMD_NDUMP;      {DUMP DATA AND CMD FOR VERTEX CMD}
            COM_SET;             {SET COMMAND INTO YW STACK}
            IF (SIDE_DOOR_CMD) THEN
                COM_LD
            ELSE
                DATA_LD;         {TELL INTERPOLATOR DATA LOADED}
            END
        ELSE
            BEGIN
            SIDE_FLUSH_FLAG;
            IF (SIDE_DOOR_CMD) THEN SIDE_DOOR_CMD;
            END;
        END;
    IF (COMMAND_FULLX * ~COM_BUSY * ~VEC_PIXEL)  THEN
                                     {INPUT FULL & I'M NOT}
        BEGIN
        IF (COMMAND_BITX) THEN       {GONE ON TO NEXT COMMAND}
            NEXT_STATE CHECK_X_STEPPER
        ELSE
            BEGIN
            D_CMD_X;
            TEMP_CMD_LD;
            COMMAND_TAKEN;           {TELL E.S. THAT COMMAND TAKEN}
            SIDE_FLUSH_FLAG;         {FLUSH DATA NEXT STATE}
            NEXT_STATE SIDE_DOOR_5;
            END;
        END
    ELSE
        NEXT_STATE SIDE_DOOR_5;
    END;                         {END OF STATE SIDE_DOOR_6}

OTHERWISE
    BEGIN
    ?SIDE_DOOR[0];
    ?SIDE_DOOR[1];
    ?SIDE_DOOR[2];
    ?SIDE_FLUSH_FLAG;
    ?SIDE_DOOR_CMD;
    END;

END;                             {END OF CASE}
END;                             {END OF MACHINE SIDE_DOOR}
```

We claim:

1. A pipelined processing system comprising:

a data pipeline having at least one pipelined processing circuit for processing data;

a system clock for applying clocking signals to the at least one pipelined processing circuit of the data pipeline for clocking data processing commands and data therethrough; and pipeline control means for controlling access to critical resources of said data pipeline needed by said data pipeline for processing said data processing commands and data, said pipeline control means comprising first and second control processes which access said critical resources during respective phases of said system clock during processing of said data processing commands and data by said at least one pipelined processing circuit, said first control process receiving data processed by said second control process as input and being synchronized to a first phase of the system clock for controlling access to said critical resources of the data pipeline during said first phase of the system clock, and said second control process being synchronized to a second phase of the system clock for controlling access to said critical resources of the data pipeline during said second phase of the system clock, said first control process sharing critical resources with said second control process for processing of common data with said second control process without first checking availability of said critical resources shared with said second control process.

2. A system as in claim 1, wherein said critical resources comprise a control line from said pipeline control means to said at least one pipelined processing circuit for passing control signals therebetween.

3. A system as in claim 2, wherein said first and second control processes are implemented in a PLA having line drivers for connecting respective outputs of said PLA to said control line.

4. A pixel processor of a pipelined graphics processing system, said pixel processor comprising:
   a graphics delta pipeline having at least one pipelined pixel processing circuit for processing pixel data;
   a system clock for applying clocking signals to the at least one pipelined pixel processing circuit of the graphics data pipeline for clocking data processing commands and pixel data therethrough; and
   pipeline control means for controlling access to critical resources of said graphics data pipeline needed by said graphics data pipeline for processing said data processing commands and pixel data, said pipeline control means comprising first and second control processes which access said critical resources during respective phases of said system clock during processing of said data processing commands and pixel data by said at least one pipelined pixel processing circuit, said first control process receiving data processed by said second control process as input and being synchronized to a first phase of the system clock for controlling access to said critical resources of the graphics data pipeline during said first phase of the system clock, and said second control process being synchronized to a second phase of the system clock for controlling access to said critical resources of the graphics data pipeline during said second phase of the system clock, said first control process sharing critical resources with said second control process for processing of common data with said second control process without first checking availability of said critical resources shared with said second control process.

5. A system as in claim 4, wherein said critical resources comprise a control line from said pipeline control means to said at least one pipelined pixel processing circuit for passing control signals therebetween.

6. A system as in claim 5, wherein said first and second control processes are implemented in a PLA having line drivers for connecting respective outputs of said PLA to said control line.

7. A method of processing pipeline commands in a pipelined processing system, said processing method comprising the steps of:
   (a) determining whether an input pipeline command is a particular type of input command which can only be processed by predetermined circuitry of said pipelined processing system;
   (b) if said input pipeline command is not said particular type of input command, processing said input pipeline command and accessing critical resources of said pipelined processing system during a first predetermined phase of a system clock under control of a first control process; and
   (c) if said input pipeline command is said particular type of input command, then performing the steps of:
      (1) processing said input pipeline command and accessing critical resources of said pipelined processing system during said first predetermined phase of said system clock under control of said first control process,
      (2) determining, under control of a second control process, whether a next input command is a type of input command which has no data dependencies on data resulting from processing of said input pipeline command under control of said first control process,
      (3) if said next input command is said type of input command which has no data dependencies on data resulting from processing of said input pipeline command under control of said first control process, processing said next input command and accessing critical resources of said pipelined processing system during a second predetermined phase of the system clock under control of said second control process concurrently with processing of said input pipeline command under control of said first control process,
      (4) repeating step (3) until (a) completion of processing of said input pipeline command under control of said first control process or (b) receipt by said second control process of an input command which has data dependencies on data resulting from processing of said input pipeline command under control of said first control process,
      (5) providing a result of processing of said next input command under control of said second control process to said first control process for processing in accordance with subsequent input pipeline commands, and
      (6) returning to step (a) for reading in said subsequent input pipeline commands.

* * * * *